(12) United States Patent
Finnerty et al.

(10) Patent No.: US 10,647,572 B2
(45) Date of Patent: May 12, 2020

(54) LIQUID FUEL REFORMER INCLUDING A VAPORIZER AND METHOD OF REFORMING LIQUID REFORMABLE FUEL

(71) Applicant: Watt Fuel Cell Corp., Mount Pleasant, PA (US)

(72) Inventors: Caine M. Finnerty, Mount Pleasant, PA (US); Paul DeWald, Scottdale, PA (US)

(73) Assignee: Watt Fuel Cell Corp., Mount Pleasant, PA (US)

(*) Notice: Subject to any disclaimer, the term of this patent is extended or adjusted under 35 U.S.C. 154(b) by 34 days.

(21) Appl. No.: 15/864,550

(22) Filed: Jan. 8, 2018

(65) Prior Publication Data

US 2018/0141807 A1     May 24, 2018

Related U.S. Application Data

(63) Continuation of application No. 15/033,802, filed as application No. PCT/US2014/064351 on Nov. 6, 2014, now Pat. No. 9,878,908.

(Continued)

(51) Int. Cl.
*C01B 3/36* (2006.01)
*B01J 12/00* (2006.01)
(Continued)

(52) U.S. Cl.
CPC ............... *C01B 3/36* (2013.01); *B01J 4/001* (2013.01); *B01J 4/002* (2013.01); *B01J 4/005* (2013.01); *B01J 12/007* (2013.01); *B01J 19/0013* (2013.01); *B01J 19/24* (2013.01); *B01J 19/2425* (2013.01); *C01B 3/326* (2013.01); *C01B 3/386* (2013.01); *H01M 8/0618* (2013.01); *H01M 8/0631* (2013.01); *H01M 8/22* (2013.01); *B01J 2219/002* (2013.01); *B01J 2219/0006* (2013.01);
(Continued)

(58) Field of Classification Search
CPC .................... H01M 8/0618; H01M 8/0631
See application file for complete search history.

(56) References Cited

U.S. PATENT DOCUMENTS 2,945,077 A   7/1960 Polk
3,518,284 A   6/1970 Foster
(Continued)

FOREIGN PATENT DOCUMENTS

EP    1382382 A1   1/2004
EP    1787950 A2   5/2007
(Continued)

OTHER PUBLICATIONS

C. Finnerty, K. Kendall, G. A. Tompsett, Integrated Catalytic Burner/Micro-SEFC Design and Applications Electrochemistry, 68 (2) (2000) 519-521.

(Continued)

*Primary Examiner* — Olatunji A Godo
(74) *Attorney, Agent, or Firm* — Dilworth & Barrase, LLP

(57) ABSTRACT

A liquid fuel reformer includes a fuel vaporizer which utilizes heat from an upstream source of heat, specifically, an electric heater, operable in the start-up mode of the reformer, and therefore independent of the reforming reaction zone of the reformer, to vaporize fuel in a downstream vaporization zone.

16 Claims, 13 Drawing Sheets

Related U.S. Application Data

(60) Provisional application No. 61/900,510, filed on Nov. 6, 2013.

(51) Int. Cl.
| | | |
|---|---|---|
| *B01J 4/00* | (2006.01) | |
| *B01J 19/00* | (2006.01) | |
| *B01J 19/24* | (2006.01) | |
| *C01B 3/32* | (2006.01) | |
| *H01M 8/0612* | (2016.01) | |
| *C01B 3/38* | (2006.01) | |
| *H01M 8/22* | (2006.01) | |

(52) U.S. Cl.
CPC .......... *B01J 2219/00006* (2013.01); *B01J 2219/00058* (2013.01); *B01J 2219/00069* (2013.01); *B01J 2219/00074* (2013.01); *B01J 2219/00103* (2013.01); *B01J 2219/00132* (2013.01); *B01J 2219/00135* (2013.01); *B01J 2219/00159* (2013.01); *B01J 2219/00213* (2013.01); *B01J 2219/00234* (2013.01); *B01J 2219/00238* (2013.01); *B01J 2219/24* (2013.01); *C01B 2203/0205* (2013.01); *C01B 2203/0261* (2013.01); *C01B 2203/041* (2013.01); *C01B 2203/066* (2013.01); *C01B 2203/085* (2013.01); *C01B 2203/0833* (2013.01); *C01B 2203/0838* (2013.01); *C01B 2203/1005* (2013.01); *C01B 2203/1276* (2013.01); *C01B 2203/1282* (2013.01); *C01B 2203/1288* (2013.01)

(56) References Cited

U.S. PATENT DOCUMENTS

| | | | |
|---|---|---|---|
| 3,560,167 | A | 2/1971 | Bruckner et al. |
| 4,473,622 | A * | 9/1984 | Chludzinski ........ H01M 8/0612 |
| | | | 201/15 |
| 4,588,659 | A | 5/1986 | Abens et al. |
| 4,751,057 | A | 6/1988 | Westerman |
| 4,894,205 | A | 1/1990 | Westerman et al. |
| 5,149,156 | A | 9/1992 | Kleefeldt |
| 5,149,516 | A | 9/1992 | Han et al. |
| 5,447,705 | A | 9/1995 | Petit et al. |
| 5,527,631 | A | 6/1996 | Singh et al. |
| 5,573,737 | A | 11/1996 | Balachandran et al. |
| 5,596,514 | A | 1/1997 | Maher, Jr. et al. |
| 5,648,582 | A | 7/1997 | Schmidt et al. |
| 5,690,763 | A | 11/1997 | Ashmead et al. |
| 6,033,793 | A | 3/2000 | Woods et al. |
| 6,284,398 | B1 | 9/2001 | Kiryu |
| 6,296,814 | B1 | 10/2001 | Bonk et al. |
| 6,379,586 | B1 | 4/2002 | Zeng et al. |
| 6,383,469 | B1 | 5/2002 | Lamla et al. |
| 6,383,670 | B1 | 5/2002 | Edlund et al. |
| 6,402,989 | B1 | 6/2002 | Gaffney |
| 6,403,049 | B1 | 6/2002 | Van Keulen et al. |
| 6,447,940 | B1 | 9/2002 | Ueda |
| 6,458,334 | B1 | 10/2002 | Tamhankar et al. |
| 6,465,118 | B1 | 10/2002 | Dickman et al. |
| 6,488,838 | B1 | 12/2002 | Tonkovich et al. |
| 6,488,907 | B1 | 12/2002 | Barnes et al. |
| 6,492,050 | B1 | 12/2002 | Semmes |
| 6,521,204 | B1 | 2/2003 | Borup et al. |
| 6,565,817 | B1 | 5/2003 | Kiryu |
| 6,576,359 | B2 | 6/2003 | Fronk |
| 6,585,940 | B2 | 7/2003 | Abe et al. |
| 6,641,625 | B1 | 11/2003 | Clawson et al. |
| 6,641,795 | B2 | 11/2003 | Abe |
| 6,656,623 | B2 | 12/2003 | Holmes et al. |
| 6,667,123 | B2 | 12/2003 | Yu |
| 6,673,270 | B1 | 1/2004 | De Jong et al. |
| 6,692,707 | B1 | 2/2004 | Hirabayashi |
| 6,699,609 | B2 | 3/2004 | Kotani et al. |
| 6,702,960 | B1 | 3/2004 | Schaddenhorst et al. |
| 6,726,853 | B2 | 4/2004 | Okado et al. |
| 6,749,958 | B2 | 6/2004 | Pastula et al. |
| 6,770,106 | B1 | 8/2004 | Okamoto et al. |
| 6,783,742 | B2 | 8/2004 | Bentley et al. |
| 6,790,247 | B2 | 9/2004 | Childress et al. |
| 6,790,431 | B2 | 9/2004 | Wang et al. |
| 6,800,387 | B2 | 10/2004 | Shimada et al. |
| 6,833,208 | B2 | 12/2004 | Kotani et al. |
| 6,833,536 | B2 | 12/2004 | Shigeura |
| 6,869,456 | B2 | 3/2005 | Salemi et al. |
| 6,872,379 | B2 | 3/2005 | Zahringer et al. |
| 6,878,667 | B2 | 4/2005 | Gaffney et al. |
| 6,881,508 | B2 | 4/2005 | Penev |
| 6,887,436 | B1 | 5/2005 | Fisher et al. |
| 6,887,456 | B2 | 5/2005 | Xu et al. |
| 6,921,596 | B2 | 7/2005 | Kelly et al. |
| 6,932,950 | B1 | 8/2005 | Guetlhuber |
| 6,984,371 | B2 | 1/2006 | Zhao et al. |
| 7,001,867 | B2 | 2/2006 | Jin et al. |
| 7,037,349 | B2 | 3/2006 | Dauer et al. |
| 7,048,897 | B1 | 5/2006 | Koripella et al. |
| 7,070,633 | B2 | 7/2006 | Okada et al. |
| 7,070,752 | B2 | 7/2006 | Zeng et al. |
| 7,132,184 | B2 | 7/2006 | Ogino et al. |
| 7,090,826 | B2 | 8/2006 | Jiang et al. |
| 7,101,531 | B2 | 9/2006 | Kamijo |
| 7,115,233 | B2 | 10/2006 | Okada et al. |
| 7,118,717 | B2 | 10/2006 | Shore |
| 7,147,836 | B2 | 12/2006 | Ebert et al. |
| 7,147,946 | B2 | 12/2006 | Kawasumi et al. |
| 7,156,866 | B1 | 1/2007 | Nakamura et al. |
| 7,189,371 | B2 | 3/2007 | Iwasaki |
| 7,192,458 | B1 | 3/2007 | Harness et al. |
| 7,232,352 | B2 | 6/2007 | Splaine |
| 7,247,258 | B2 | 7/2007 | Jung et al. |
| 7,285,247 | B2 | 10/2007 | Smaling et al. |
| 7,294,421 | B2 | 11/2007 | Noetzel et al. |
| 7,323,148 | B2 | 1/2008 | Shah et al. |
| 7,328,691 | B2 | 2/2008 | Hataura et al. |
| 7,335,432 | B2 | 2/2008 | Koripella |
| 7,344,572 | B2 | 3/2008 | Yamamoto |
| 7,344,687 | B2 | 3/2008 | Oi et al. |
| 7,364,812 | B2 | 4/2008 | Taylor et al. |
| 7,368,482 | B2 | 5/2008 | Basini et al. |
| 7,422,810 | B2 | 9/2008 | Venkataraman et al. |
| 7,490,580 | B2 | 2/2009 | Hanai et al. |
| 7,578,861 | B2 | 8/2009 | Kah et al. |
| 7,585,810 | B2 | 9/2009 | Chen et al. |
| 7,625,414 | B2 | 12/2009 | Nougier et al. |
| 7,632,320 | B2 | 12/2009 | Tonkovich et al. |
| 7,691,509 | B2 | 4/2010 | Han et al. |
| 7,704,618 | B2 | 4/2010 | Venkataraman et al. |
| 7,736,399 | B2 | 6/2010 | Ravenda et al. |
| 7,846,599 | B2 | 12/2010 | Ballantine et al. |
| 7,858,214 | B2 | 12/2010 | Kelly et al. |
| 7,888,278 | B2 | 2/2011 | Rapier et al. |
| 7,901,814 | B2 | 3/2011 | Venkataraman et al. |
| 7,976,787 | B2 | 7/2011 | England et al. |
| 7,985,506 | B2 | 7/2011 | Lee et al. |
| 7,985,509 | B2 | 7/2011 | Kim et al. |
| 7,998,456 | B2 | 10/2011 | Van Dijk et al. |
| 8,034,504 | B2 | 10/2011 | Tsunoda et al. |
| 8,062,800 | B2 | 11/2011 | Cho et al. |
| 8,142,941 | B2 | 3/2012 | Bitoh |
| 8,158,289 | B2 | 4/2012 | Cutright et al. |
| 8,173,310 | B2 | 5/2012 | Son |
| 8,241,600 | B1 | 8/2012 | Berry et al. |
| 8,257,669 | B2 | 9/2012 | Jankowski |
| 8,277,524 | B2 | 10/2012 | Keegan et al. |
| 8,298,711 | B2 | 10/2012 | Yanase et al. |
| 8,304,122 | B2 | 11/2012 | Pushusta et al. |
| 8,318,363 | B2 | 11/2012 | Lim |
| 8,323,365 | B2 | 12/2012 | Drnevich et al. |
| 8,337,757 | B2 | 12/2012 | Roychoudhury et al. |
| 8,354,083 | B2 | 1/2013 | Amsden et al. |
| 8,486,162 | B2 | 7/2013 | Kim et al. |
| 8,557,451 | B2 | 10/2013 | Edlund et al. |

(56) References Cited

U.S. PATENT DOCUMENTS

| | | | |
|---|---|---|---|
| 2003/0054215 | A1 | 3/2003 | Doshi et al. |
| 2003/0064259 | A1 | 4/2003 | Gittleman |
| 2003/0188486 | A1 | 10/2003 | Tanaka et al. |
| 2003/0211021 | A1 | 11/2003 | Oi et al. |
| 2003/0211373 | A1 | 11/2003 | Ueda et al. |
| 2003/0218991 | A1 | 11/2003 | Besecker et al. |
| 2003/0234455 | A1 | 12/2003 | Mieney et al. |
| 2003/0235726 | A1 | 12/2003 | Kelly et al. |
| 2004/0009104 | A1 | 1/2004 | Kaupert et al. |
| 2004/0076562 | A1 | 4/2004 | Manzanec et al. |
| 2004/0144030 | A1 | 7/2004 | Smaling |
| 2004/0180247 | A1 | 9/2004 | Higashiyama et al. |
| 2004/0191591 | A1 | 9/2004 | Yamamoto |
| 2005/0008907 | A1 | 1/2005 | Isozaki et al. |
| 2005/0028445 | A1 | 2/2005 | Roychoudhury et al. |
| 2005/0069485 | A1 | 3/2005 | Jung et al. |
| 2005/0081444 | A1 | 4/2005 | Anumakonda et al. |
| 2005/0164046 | A1 | 7/2005 | Fujihara et al. |
| 2005/0188615 | A1 | 9/2005 | Sennoun et al. |
| 2005/0191533 | A1 | 9/2005 | Kim et al. |
| 2005/0267606 | A1 | 12/2005 | Barlett, Jr. et al. |
| 2006/0051634 | A1 | 3/2006 | DeVries |
| 2006/0067861 | A1 | 3/2006 | Tonkovich et al. |
| 2006/0133976 | A1 | 6/2006 | Male et al. |
| 2006/0179717 | A1 | 8/2006 | LaBarge |
| 2006/0246333 | A1 | 11/2006 | Schaevitz et al. |
| 2007/0084118 | A1 | 4/2007 | Kaeding et al. |
| 2007/0104641 | A1 | 5/2007 | Ahmed et al. |
| 2007/0183949 | A1 | 8/2007 | Fischer |
| 2007/0289215 | A1 | 12/2007 | Hemmings et al. |
| 2008/0138273 | A1 | 6/2008 | Jiang |
| 2008/0152970 | A1 | 6/2008 | Rush et al. |
| 2008/0187797 | A1 | 8/2008 | Edlund |
| 2009/0029205 | A1 | 1/2009 | Venkatamaran et al. |
| 2009/0104482 | A1 | 4/2009 | Miyazaki |
| 2009/0208784 | A1 | 8/2009 | Perry et al. |
| 2009/0291335 | A1 | 11/2009 | Anzai |
| 2010/0015479 | A1 | 1/2010 | Rusch et al. |
| 2010/0062292 | A1 | 3/2010 | Lin et al. |
| 2010/0119894 | A1 | 5/2010 | Ishida |
| 2010/0203404 | A1 | 8/2010 | Miyazaki |
| 2010/0330446 | A1 | 12/2010 | Lucka et al. |
| 2011/0039175 | A1 | 2/2011 | Yokoyama et al. |
| 2011/0120137 | A1* | 5/2011 | Ennis ............... H01M 8/04082 60/780 |
| 2011/0165483 | A1 | 7/2011 | Yamamoto et al. |
| 2011/0189578 | A1 | 8/2011 | Crumm et al. |
| 2011/0269032 | A1 | 11/2011 | Fischer et al. |
| 2012/0062166 | A1 | 3/2012 | Thornton et al. |
| 2012/0088167 | A1 | 4/2012 | Reiners et al. |
| 2012/0164547 | A1 | 6/2012 | Weingaerthner et al. |
| 2012/0328969 | A1 | 12/2012 | Dewald et al. |
| 2013/0028815 | A1 | 1/2013 | Basini et al. |
| 2013/0056911 | A1 | 3/2013 | Finnerty et al. |
| 2013/0059223 | A1 | 3/2013 | Finnerty et al. |
| 2013/0230787 | A1 | 9/2013 | Finnerty et al. |
| 2014/0335463 | A1 | 11/2014 | Friedrich et al. |

FOREIGN PATENT DOCUMENTS

| | | |
|---|---|---|
| GB | 1314984 A | 4/1973 |
| JP | H03179121 A | 8/1991 |
| JP | 2001158601 A | 6/2001 |
| JP | 2001227419 A | 8/2001 |
| JP | 2003021308 A | 1/2003 |
| JP | 2004035400 A | 2/2004 |
| WO | 9841394 A1 | 9/1998 |
| WO | 02099917 A2 | 12/2002 |
| WO | 2004/091771 A1 | 10/2004 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R.H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N.J. Coe, R.H. Cunningham and R.M. Ormerod, "Steam Reforming and Partial Oxidation of Methane over nickel/zirconia and doped nickel/zirconia anodes in working solid oxide fuel cells." Catalysis Today, in press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in solid oxide fuel cells running on natural gas." Radiation Effects and Defects in Solids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem. Soc., 1997, 973-983.

Finnerty C, Cunningham RH, Ormerod RM, "Development of a novel solid oxide fuel cell system based on a tubular zirconia reactor." Radiaton Effects and Defects in Solids [ISSN 1042-0150]. vol. 151 pp. 71-76.

Finnerty, Caine, and David Coimbra, "Solid oxide fuel cells with novel internal geometry." U.S. Pat. No. 6,998,187. Feb. 14, 2006.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.

Finnerty C, Cunningham RN, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.

Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by the Electrochemical Society, ISBN 1-56677-242-7.

Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by the Electrochemical Society, ISBN 1-56677-242-7.

Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.

Caine Finnerty, Neil J. Coe, Robert H. Cunningham and R. Mark Ormerod, "Carbon formation on and deactivation of nickel-based/zirconia anodes in solid oxide fuel cells running on methane." Catalysis Today, vol. 46, Issues 2-3, Nov. 16, 1998, pp. 137-145.

K. Kendall, C. Finnerty, G. Saunders and J. T. Chung, "Effects of dilution on methane entering an SOFC anode" Journal of Power Sources, vol. 106, Issues 1-2, Apr. 1, 2002, pp. 323-327.

(56) References Cited

OTHER PUBLICATIONS

G. A. Tompsett, C. Finnerty, K. Kendall, T. Alston and N. M. Sammes, "Novel applications for micro-SOFCs." Journal of Power Sources, vol. 86, Issues 1-2, Mar. 2000, pp. 376-382.
Caine Finnerty and R. Mark Ormerod, "Internal reforming over nickel/zirconia anodes in SOFCs operating on methane: influence of anode formulation, pre-treatment and operating conditions." Journal of Power Sources, vol. 86, Issues 1-2, Mar. 2000, pp. 390-394.
C. Finnerty, T. Alston, K. Kendall and R.M. Ormerod, "Development of a small portable SOFC system with integrated catalytic fuel processing." Sixth Grove Fuel Cell Symposium, Sep. 1999, 125.
C. Finnerty, K. Kendall, J. C. Austin, T. Alston ,"Ceramic fuel cells to replace metal burners." Journal of Material science, 36, (2001) 1119-1124.
Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.
P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.
P.K. Cheekatamarla, C. M. Finnerty, "Synthesis gas generation via partial oxidation reforming of liquid fuels." Accepted for publication, International Journal of Hydrogen Energy, 2008.
Y. Du, C, Finnerty, and J. Jiang, "Thermal Stability of Portable Microtubular SOFCs and Stacks." In press, Journal of the Electrochemical Society, 155(9), 1-XXXX, (2008).
Y. Du, C. Finnerty, and J. Jiang, "Thermal Stability of Portable Micro-Tubular Solid Oxide Fuel Cell and Stack" ECS Trans. 12, (1) 363 (2008).
P.K. Cheekatamarla, C.M. Finnerty , Jun Cai, "Internal reforming of hydrocarbon fuels in tubular solid oxide fuel cells." International Journal of Hydrogen Energy, vol. 33, Issue 7, Apr. 2008, pp. 1853-1858.
Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.
P.K. Cheekatamarla, C.M. Finnerty, "Hydrogen Generation via partial oxidation reforming of liquid fuels." Prepr. Pap.-Am. hem, Soc., Div. Fuel Chem. 2007, 52 (2), 288.
P.K. Cheekatamarla, C.M. Finnerty , Jun Cai, "Internal reforming of hydrocarbon fuels in tubular solid oxide fuel cells." ECS Trans. 12, (1) 439 (2008).
P. K. Cheekatamarla, C. M. Finnerty, A. Stanley, C. Robinson, P. Dewald, Y. Lu, Y. Du, "Performance Characteristics of an Integrated Portable JP8 SOFC—Reformer System." ECS Transactions vol. 5, Mar. 2007.
C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.
C. Finnerty, C. Robinson, S. Andrews, Y. Du, P. Cheekatamarla, P. Dewald, Y. Lu, T. Schwartz, "Portable Propane Micro-Tubular SOFC System Development." ECS Transactions—Solid Oxide Fuel Cells, vol. 7, Jun. 2007.

D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.
D. Bhattacharya, R, Rengaswamy and C. Finnerty, "Dynamic Simulation and Analysis of a Solid Oxide Fuel Cell", in the proceedings of ESCAPE-17, Bucharest, 2007.
Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.
Debangsu Bhattacharya, Raghunathan Rengaswamy and Caine Finnerty, "A Twodimensional Dynamic Model for Tubular Solid Oxide Fuel Cell", presented at the Annual AIChE meeting, San Francisco, 2006.
Debangsu Bhattacharya, Raghunathan Rengaswamy and Caine Finnerty, "Optimization Studies on Anode-Supported Tubular Solid Oxide Fuel Cells", presented at the Annual AIChE Meeting, Salt Lake City, 2007.
Debangsu Bhattacharya, Raghunathan Rengaswamy and Caine Finnerty, "Dynamics and Volterra-Model Based Control of a Tubular Solid Oxide Fuel Cell", presented at the Annual AIChE Meeting, Salt Lake City, 2007.
Debangsu Bhattacharya, Raghunathan Rengaswamy and Caine Finnerty, "Identification and Control of a Tubular Solid Oxide Fuel Cell ( SOFC)", presented at the Annual AIChE meeting, Philadelphia, 2008.
Praveen K. Cheekatamarla, Caine M. Finnerty, Yanhai Du, Juan Jiang, Jian Dong, P.G. Dewald, C.R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.
Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/kerosene fueled portable SOFC power generator", Original Research Article Journal of Power Sources, vol. 193, Issue 2, Sep. 5, 2009, pp. 797-803.
Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9, May 1, 2009, pp. 2158-2172.
Zuo, Chendong et al. "Advanced Anode-supported Micro-tubular SOFC Development." ECS Transactions 17.1 (2009): 103-110.
Finnerty, Caine, and David Coimbra, "Anode-supported solid oxide fuel cells using a cermet electrolyte." U.S. Pat. No. 7,498,095. Mar. 3, 2009.
Finnerty, Caine M. "The catalysis and electrical performance of nickel-based/zirconia fuel reforming anodes in solid oxide fuel cells running on methane." Diss. University of Keele, 1998.
Khaligh, Alireza, et al. "Digital control of an isolated active hybrid fuel cell/Li-ion battery power supply." IEEE Transactions on Vehicular technology 56.6 (2007): 3709-3721.
Lankin, Michael, Yanhai Du, and Caine Finnerty, "A review of the implications of silica in solid oxide fuel cells." Journal of Fuel Cell Science and Technology 8.5 (2011): 054001.

\* cited by examiner

LIQUID FUEL REFORMER INCLUDING A VAPORIZER AND METHOD OF REFORMING LIQUID REFORMABLE FUEL

CROSS REFERENCE TO RELATED APPLICATION

This application is a continuation of application Ser. No. 15/033,802, which was filed on May 2, 2016 which claims benefit from national stage of International Application No. PCT/US2014/064351, which was filed on Nov. 6, 2014, and which claims priority to U.S. Provisional Application No. 61/900,510 filed on Nov. 6, 2013, the entire contents of each of which are incorporated herein by reference.

BACKGROUND OF THE INVENTION

This disclosure relates to liquid fuel reformers and, more particularly, to such reformers that include a fuel vaporizer for vaporizing, or evaporating, a liquid fuel prior to its introduction into a gas phase reforming reaction zone.

A liquid fuel gas phase reformer is a chemical reactor in which a gaseous reformable reaction mixture containing a vaporized liquid fuel such as methanol, ethanol, distillate, naphtha, kerosene, gasoline, diesel, bio-diesel, etc., or combination thereof, and an oxygen-containing gas, typically air, and in the case of a steam reformer or autothermal reformer, water as steam, is converted in the gas phase into a hydrogen-rich reformate, commonly referred to as "synthesis gas" or "syngas". Reformers of this type include some means for vaporizing, or evaporating, the liquid fuel prior to or as the fuel is mixed with the oxygen-containing gas, and if utilized the steam, components of the reformable reaction mixture.

In one known type of vaporizer for a liquid fuel reformer, liquid fuel at ambient temperature is directed as a spray against an electrically heated surface with vaporization of the fuel occurring upon contact with the hot surface. Liquid fuel vaporizers that operate on the principle of contact of the fuel with a hot surface, i.e., "contact vaporization", are subject to the disadvantage that rapid introduction of ambient temperature fuel (so-called "cold fuel") onto a hot surface can cause the fuel droplets to bounce off without vaporizing and fuel droplets that do adhere to the hot surface to decompose by pyrolysis. Either of these occurrences can result in the buildup of tars and/or coke that are inimical to the efficient operation of the reformer and, it may be added in the case of a reformer supplying hydrogen-rich reformate to a fuel cell system, the efficient operation of the fuel cell system as well.

It is known to vaporize liquid fuel in a liquid fuel reformer by heating the fuel to its vaporization temperature with hot gas resulting from the combustion of a portion of the liquid fuel with oxygen supplied as air. While a fuel vaporizer of this type avoids the drawbacks of contact vaporization noted above, it is subject to the disadvantage that the combustion reaction risks the formation of carbon black and/or other carbon-rich pyrolysis products such as tars and coke that over time will accumulate resulting in progressive degradation of the performance of the reformer of which the vaporizer is a part.

A need therefore exists for a fuel vaporizer for incorporation in a liquid fuel reformer that avoids the foregoing drawbacks of known vaporizer devices while providing effective and thermally efficient vaporization of all types of reformable liquid fuels.

SUMMARY OF THE INVENTION

In accordance with the present disclosure, there is provided a liquid fuel reformer system for the production of hydrogen-rich reformate, the liquid fuel reformer system can include a liquid fuel reformer can include a reformer inlet; a conduit comprising an oxygen-containing gas inlet, a liquid reformable fuel inlet located downstream from the oxygen-containing gas inlet, and a gaseous reaction mixture outlet located downstream from the liquid reformable fuel inlet, where the conduit can provide fluid communication among the oxygen-containing gas inlet, the liquid reformable fuel inlet and the gaseous reaction mixture outlet, and the gaseous reaction mixture outlet can be in fluid communication with the reformer inlet; a first source of heat can include an electric heater, the first source of heat can be disposed in the conduit at a location downstream from the oxygen-containing gas inlet and upstream from the liquid reformable fuel inlet; a second source of heat can include heat of exotherm from the liquid fuel reformer and/or a hydrogen reformate-consuming device external to the liquid fuel reformer, the second source of heat can be in thermal communication with the conduit and at a location downstream from the first source of heat and upstream from the liquid reformable fuel inlet, a vaporizer, the vaporizer can be disposed in the conduit at a location downstream from the liquid reformable fuel inlet or defining the liquid reformable fuel inlet, and a hydrogen-rich reformate outlet.

In the liquid fuel reformer system a third source of heat can include an electric heater and can be disposed within the conduit downstream from the second source of heat.

In the liquid fuel reformer system an electric heater can be an electrical resistance heater.

In the liquid fuel reformer system a heat exchanger structure can be disposed in thermal communication with the liquid reformer.

In the liquid fuel system the main gas flow conduit can further include a branch conduit having an oxygen-containing gas inlet disposed within or externally to the main conduit an oxygen-containing gas inlet connected to the main conduit and disposed downstream from the vaporizer.

The liquid fuel reformer system can also include a controller, the controller in operable communication with a thermocouple located in the conduit at or downstream from an outlet of the vaporizer, a thermocouple located in the conduit upstream of the vaporizer, an oxygen-containing gas flow meter located in the conduit upstream of the vaporizer, a liquid reformable fuel flow meter located at or upstream of the liquid reformable fuel inlet, a source of oxygen-containing gas, a source of liquid reformable fuel, the first source of heat and the second source of heat.

In the liquid fuel reformer system the hydrogen reformate-consuming device can include a fuel cell unit.

In the liquid fuel reformer system the second source of heat can include heat of exotherm from a fuel cell stack and/or an afterburner of a fuel cell stack.

In the liquid fuel reformer system the vaporizer can include a liquid fuel line, the liquid fuel line providing fluid communication between the vaporizer and a source of liquid fuel.

In the liquid fuel reformer system the terminal section of the liquid fuel line located in the conduit can include a fuel spreader.

In the liquid fuel reformer system the liquid fuel line can include a heat transfer section, the heat transfer section of the liquid fuel line can be in thermal communication with and in proximity to at least one of the first source of heat and the second source of heat.

In the liquid fuel reformer system the vaporizer can include a fuel spreader.

In the liquid fuel reformer system the fuel spreader can be a wick or a sprayer.

In the liquid fuel reformer system the liquid fuel reformer can be an autothermal reformer.

In the liquid fuel reformer system the oxygen-containing gas inlet can be replaced with a water/steam inlet, and the liquid fuel reformer can be a steam reformer.

In the liquid fuel reformer system the second and any third source of heat can be located proximate to and upstream from the vaporizer.

In accordance with the present disclosure, there is provided a method of reforming a liquid reformable fuel, the method can include introducing an oxygen-containing gas into a conduit for routing fluids toward an inlet of a reformer; heating a stream of the oxygen-containing gas with at least one of a first source of heat comprising heat of exotherm from the reactor and/or external hydrogen reformate consuming device, the second source of heat being in thermal communication with the conduit downstream from the first source of heat and upstream from the fuel inlet, the second source of heat providing a stream of heated oxygen-containing gas; introducing into the stream of heated oxygen-containing gas through or past a vaporizer a liquid reformable fuel to provide a heated gaseous reforming reaction mixture; and reforming the heated gaseous reforming reaction mixture to produce a hydrogen-rich reformate.

The method can further include heating the stream of the oxygen-containing gas and/or the stream of heated oxygen-containing gas with a third source of heat comprising an electric heater disposed within the conduit and downstream from the second source of heat.

The method can further include discontinuing heating the stream of oxygen-containing gas with the first source of heat and heating the stream of oxygen-containing gas with the second and/or third sources of heat.

The method can further include adjusting the heat supplied by the first and/or second sources of heat by the third source of heat.

The method can further include heating the liquid reformable fuel using the second source of heat and/or third source of heat, when present, prior to introducing the liquid reformable fuel into the vaporizer.

In the method the liquid reformable fuel introduced into the stream of heated oxygen-containing gas can vaporize on contact with the heated oxygen-containing gas.

In the method the electric heater(s) can be electrical resistance heaters.

In the method the hydrogen reformate-consuming device can include a fuel cell unit and the heat of exotherm can include heat from a fuel cell stack and/or an afterburner of the fuel cell stack.

The method can further include monitoring the flow rate of the stream of heated oxygen-containing gas, the flow rate of liquid reformable fuel, the temperature of the vaporizer, the temperature of the stream of heated oxygen-containing gas and the temperature of the liquid reformable fuel; and controlling the vaporization of the liquid reformable fuel in response to the results of the monitoring.

In the method controlling the vaporization can include adjusting the heat supplied by the second source of heat and/or the third source of heat.

In the method reforming the heated gaseous reforming reaction mixture can include autothermal reforming, and the method can further include introducing steam into the conduit to provide a heated gaseous reforming reaction mixture comprising the gaseous liquid reformable fuel, oxygen-containing gas and steam.

In the method introducing steam into the conduit can include introducing steam through the vaporizer.

In the method the vaporizer can include a fuel spreader and introducing steam through the vaporizer can include introducing steam through the fuel spreader.

In accordance with the present disclosure, there is provided a method of steam reforming a liquid reformable fuel, the method can include introducing water and/or steam into a conduit for routing fluids toward an inlet of a reformer; heating a stream of the water and/or steam to provide a stream of steam; introducing into the stream of steam through or past a vaporizer a liquid reformable fuel to provide a heated gaseous steam reforming reaction mixture; and reforming the heated gaseous reforming reaction mixture to produce a hydrogen-rich reformate.

The method can further include generating steam using a source of heat that can be heat of exotherm from the reformer and/or a hydrogen reformate-consuming device external to the reformer.

The method can further include introducing steam through a fuel spreader of the vaporizer.

In accordance with the present disclosure there is provided a liquid fuel reformer for the production of a hydrogen-rich reformate, the reformer can include:

an inlet for receiving a flow of gaseous reaction mixture comprising oxygen-containing gas and vaporized liquid reformable fuel, a reforming reaction zone, and an outlet for hydrogen-rich reformate;

a conduit for routing oxygen-containing gas and vaporized liquid reformable fuel to the inlet of the reformer, the conduit including an inlet for oxygen-containing gas, an inlet for liquid reformable fuel and an outlet in gaseous flow communication with the inlet of the reformer;

a first source of heat operable in a start-up mode of operation of the reformer to heat oxygen-containing gas introduced into the reformer, the first source of heat comprising an electric heater and first heating zone disposed within the conduit at a location downstream from the inlet for oxygen-containing gas and upstream from the inlet for liquid reformable fuel, heat produced by the electric heater being transferred to oxygen-containing gas introduced into the conduit thereby heating the oxygen-containing gas to within a preset range of temperature as the gas passes through the first heating zone;

a second source of heat operable in a steady state mode of operation of the reformer to heat oxygen-containing gas introduced into the reformer, the second source of heat comprising heat of exotherm recovered from the reformer and/or reformate-consuming device external to the reformer within a second heating zone disposed within the conduit at a location downstream from the inlet for oxygen-containing gas and upstream from the inlet for liquid reformable fuel, heat of exotherm recovered from the reformer and/or reformate consuming device being transferred to oxygen-containing gas introduced into the conduit thereby heating the oxygen-containing gas to within a preset range of temperature as the gas passes through the second heating zone; and, a vaporizer for vaporizing liquid reformable fuel, the vaporizer being disposed within the conduit at a location downstream from the inlet, or functioning as the inlet, for liquid reformable fuel introduced into the conduit, the liquid reformable fuel being vaporized by, and combining with, heated oxygen-containing gas passing from the first heating zone during a start-up mode of the reformer and from the second heating zone during a steady-state mode of the reformer.

Further in accordance with the disclosure, there is provided a method of reforming liquid reformable fuel in start-up and in steady-state modes of operation of a reformer to produce hydrogen-rich reformate, the method can include:

a) in a start-up mode:
(i) introducing oxygen-containing gas into a conduit for routing gas toward the inlet of a reformer, the conduit comprising an inlet for oxygen-containing gas, an inlet for liquid reformable fuel and an outlet for heated gaseous reaction mixture in gaseous flow communication with the inlet of the reformer,
(ii) heating the oxygen-containing gas by a first source of heat comprising an electric heater and first heating zone disposed within the conduit at a location downstream from the inlet for oxygen-containing gas and upstream from the inlet for liquid reformable fuel, heat produced by the electric heater being transferred to oxygen-containing gas introduced into the conduit thereby heating the oxygen-containing gas to within a preset range of temperature as the gas passes through the first heating zone,
(iii) introducing liquid reformable fuel into the conduit,
(iv) vaporizing liquid reformable fuel introduced into the conduit by a vaporizer disposed within the conduit at a location downstream from the inlet, or functioning as the inlet, for liquid reformable fuel introduced into the conduit, the liquid reformable fuel being vaporized by, and combining with, heated oxygen-containing gas passing from the first heating zone thereby providing heated gaseous reforming reaction mixture,
(v) introducing heated gaseous reforming reaction mixture from step (iv) into the inlet of the reformer, and
(vi) reforming the heated gaseous reforming reaction mixture within the reformer to commence the production of hydrogen-rich reformate; and, b) in a steady-state mode:
(vii) introducing oxygen-containing gas into the conduit,
(viii) heating the oxygen-containing gas by a second source of heat comprising heat of exotherm recovered from the reformer and/or reformate-consuming device external to the reformer within a second heating zone disposed within the conduit at a location downstream from the inlet for oxygen-containing gas and upstream from the inlet for liquid reformable fuel, heat of exotherm recovered from the reactor and/or reformate-consuming device being transferred to oxygen-containing gas introduced into the conduit thereby heating the oxygen-containing gas to within a preset range of temperature as the gas passes through the second heating zone,
(ix) introducing liquid reformable fuel into the conduit,
(x) vaporizing the liquid reformable fuel introduced into the conduit by the vaporizer of step (iv), the liquid reformable fuel being vaporized by, and combining with, heated oxygen-containing gas passing from the second heating zone thereby providing heated gaseous reforming reaction mixture,
(xi) introducing heated gaseous reforming reaction mixture from step (x) into the inlet of the reformer,
(xii) maintaining the reforming of the heated gaseous reaction mixture within the reformer thereby continuing the production of hydrogen-rich reformate, and
(xiii) limiting or discontinuing operation of the first heating source for the duration of step (xii).

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

DETAILED DESCRIPTION OF THE INVENTION

Figure 1A:
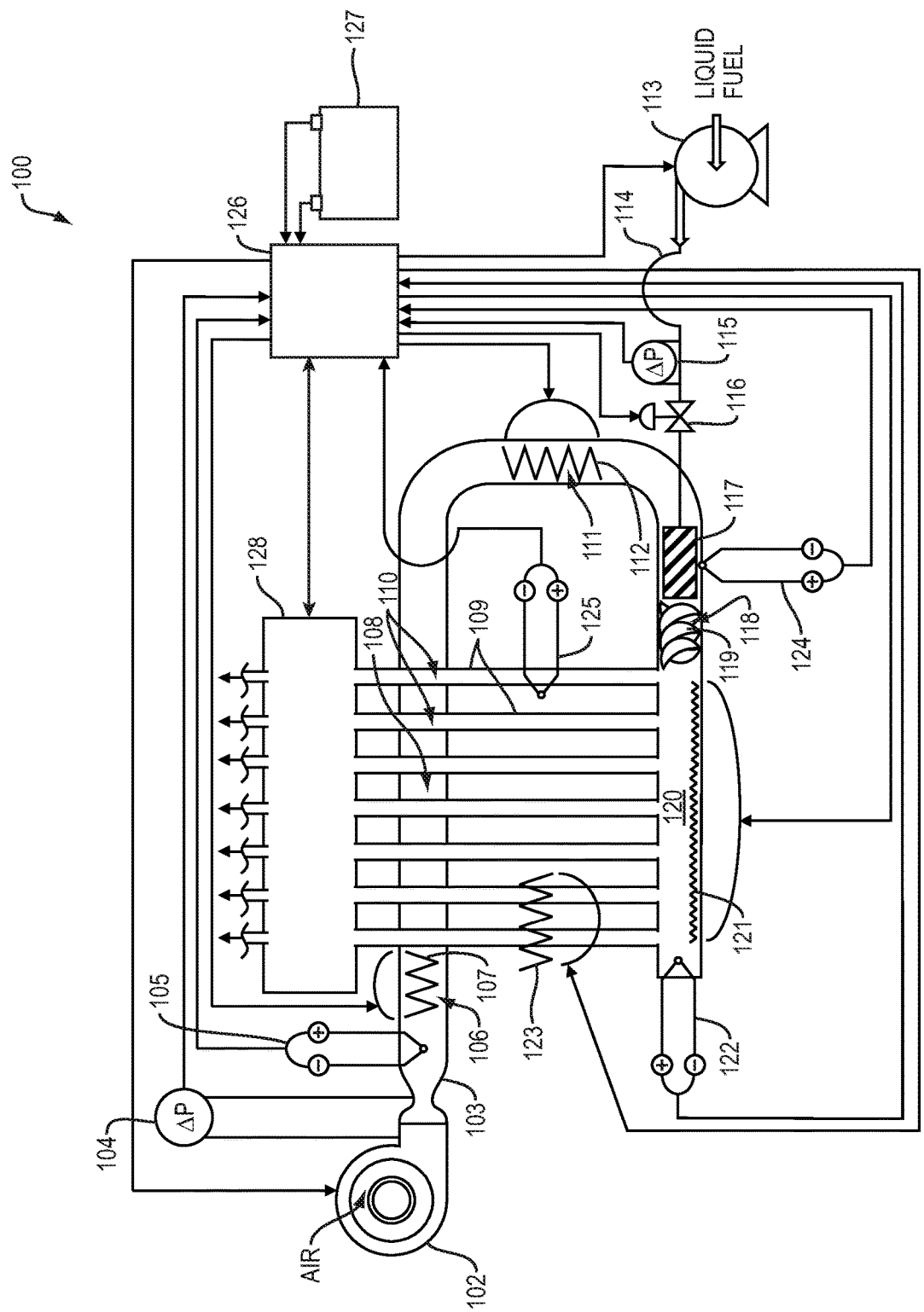
FIGS. 1A and 1B are schematic block diagrams of two embodiments of reformer and liquid fuel vaporizer in accordance with the present teachings.

It is to be understood that the present teachings herein are not limited to the particular procedures, materials and modifications described and as such can vary. It is also to be understood that the terminology used is for purposes of describing particular embodiments only and is not intended to limit the scope of the present teachings which will be limited only by the appended claims.

For brevity, the discussion and description herein will mainly focus on partial oxidation reforming reactions and reactants including catalytic partial oxidation reforming reactions and reactants (a reformable fuel and an oxygen-containing gas). However, the devices, assemblies, systems and methods described herein can apply to other reforming reactions such as steam reforming and autothermal reforming and their respective reactants (a reformable fuel and steam, and a reformable fuel, steam and an oxygen-containing gas, respectively) as well as the other reactions described herein. Accordingly, where an oxygen-containing gas is referenced herein in connection with a device or method, the present teachings should be considered as including steam in combination or alone, i.e., an oxygen-containing gas and/or steam, unless explicitly stated otherwise or understood by the context. In addition, where a reformable fuel is referenced herein in connection with a device or method, the present teachings should be considered as including steam in combination or alone, i.e., a reformable fuel and/or steam, unless explicitly stated otherwise or as understood by the context.

In addition, the reformers, systems and methods of the present teachings should be understood to be suitable to carry out steam reforming and auto thermal reforming, for example, occurring within the same structure and components and/or with the same general methods as described herein. That is, the reactors, systems and methods of the present teachings can deliver the appropriate liquid reactants, for example, liquid reformable fuel and/or liquid water, from a liquid reformable fuel reservoir to a vaporizer to create a vaporized liquid reformable fuel and steam, respectively, and the appropriate gaseous reactants, for example, at least one of an oxygen-containing gas, a gaseous reformable fuel and steam, from their respective sources to a desired component of a fuel cell unit or system, for example, a reformer.

Where water is used in the delivery system, recycled heat from one or more of a reformer, a fuel cell stack and an afterburner of a fuel cell unit or system can be used to vaporize the water to create steam, which can be present in the delivery system and/or introduced into the delivery system from an independent source.

Throughout the application, where structures, compositions, etc., are described as having, including or comprising specific components, or where methods are described as having, including or comprising specific method steps, it is contemplated that such structures, compositions, etc., also consist essentially of, or consist of, the recited components and that the such methods also consist essentially of, or consist of, the recited method steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a structure, composition or method described herein can be combined in a variety of ways without departing from the focus and scope of the present teachings whether explicit or implicit therein. For example, where reference is made to a particular structure, step or operation that structure, step or operation can be used in various embodiments of the liquid fuel reformer and/or method of liquid fuel reforming of the present teachings.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, unless steps by their nature must be conducted in sequence they can be conducted simultaneously.

At various places in the present specification, values are disclosed in groups or in ranges. It is specifically intended that a range of numerical values disclosed herein include each and every value within the range and any subrange thereof. For example, a numerical value within the range of 0 to 20 is specifically intended to individually disclose 0, 1, 2, 3, 4, 5, 6, 7, 8, 9, 10, 11, 12, 13, 14, 15, 16, 17, 18, 19 and 20, and any subrange thereof, for example, from 0 to 10, from 8 to 16, from 16 to 20, etc.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or attitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of liquid fuel reformers of the present teachings illustrated in certain of the accompanying figures.

As used herein, a "reformable fuel" refers to a liquid reformable fuel and/or a gaseous reformable fuel.

The expressions "liquid reformable fuel" and "liquid fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "gaseous reforming reaction mixture" refers to a mixture including a gaseous liquid reformable fuel (e.g., a vaporized liquid reformable fuel), a gaseous reformable fuel or combinations thereof, and an oxygen-containing gas (e.g., air) and/or water (e.g., in the form of steam). A gaseous reforming reaction mixture can be subjected to a reforming reaction to create a hydrogen-rich product ("reformate"), which also can contain carbon monoxide. Where a catalytic partial oxidation reforming reaction is to be carried out, the gaseous reforming reaction mixture can be referred to a "gaseous CPOX reforming reaction mixture," which includes a reformable fuel and an oxygen-containing gas. Where a steam reforming reaction is to be carried out, the gaseous reforming reaction mixture can be referred to as a "gaseous steam reforming reaction mixture," which includes a reformable fuel and steam. Where an autothermal reforming reaction is to be carried out, the gaseous reforming reaction mixture can be referred to as a "gaseous autothermal reforming reaction mixture," which includes a reformable fuel, an oxygen-containing gas and steam.

The term "reformer" shall be understood to include all reactors wherein the conversion of vaporized liquid reformable fuel to a hydrogen-rich reformate takes place and is inclusive, for example, of reformers of the partial oxidation (POX), catalytic partial oxidation (CPOX), steam and autothermal types.

The term "reforming" shall be understood to include the reaction(s) that occur during reforming or conversion of a reformable fuel to a hydrogen-rich reformate.

The term "reforming reaction" shall be understood to include the exothermic and/or endothermic reaction(s) that occur during the conversion of a gaseous reaction medium to a hydrogen-rich reformate. The expression "reforming reaction" herein therefore includes, for example, CPOX, autothermal and steam reforming.

Again, as stated previously for brevity, the discussion and description herein will focus on partial oxidation reforming reactions and reactants including catalytic partial oxidation reforming reactions and reactants (a reformable fuel and an oxygen-containing gas). However, the devices, assemblies, systems and methods described herein can equally apply to other reforming reactions such as steam reforming and autothermal reforming and their respective reactants as well as the other reactions described herein. For example, for steam reforming steam can replace an oxygen-containing gas in the description herein. For autothermal reforming, steam can be introduced along with an oxygen-containing gas and/or a reformable fuel in the description herein.

The term "reformate" shall be understood to apply to the hydrogen-rich effluent of a reformer and the oxidizable components thereof.

The expression "reformate-consuming device" shall be understood to include all devices that consume hydrogen-rich reformate or component(s) thereof such as fuel cells, fuel cell afterburners (tail gas burners) and other devices that generate heat by the combustion of at least one combustible component of a reformate.

DETAILED DESCRIPTION OF THE INVENTION

It is to be understood that although the present description is described as applying to a CPOX reformer, the present disclosure applies to other reformers and/or reactions.

FIG. 1A illustrates a reformer of the catalytic partial oxidation (CPOX) type. However, it is to be understood that the invention herein is not limited to CPOX reformers but is applicable to liquid fuel reformers of all types including non-catalytic partial oxidation reformers, steam reformers, autothermal reformers and reformers combining aspects of any of the foregoing wherein a fuel being processed is a liquid and must be vaporized prior to introduction (together with oxygen-containing gas) in a gaseous phase reforming reaction zone.

Referring now to the drawings, FIG. 1A illustrates one embodiment of liquid fuel reformer, specifically, a liquid fuel CPOX reformer, in accordance with the present teachings where an oxygen-containing gas component of a reforming reaction mixture is heated by the heat of exotherm resulting from CPOX reforming during a steady-state mode of operation of the liquid fuel reformer.

As shown in FIG. 1A, liquid fuel reformer 100 includes centrifugal blower 102 for introducing oxygen-containing gas, exemplified here and in the other embodiments of the present teachings by air, into conduit 103, and for driving this and other gaseous streams (inclusive of vaporized fuel-air mixture(s) and hydrogen-rich reformates) through the various passageways, including open gaseous flow passageways, of the reformer. Conduit 103 can include flow meter 104 and thermocouple 105. These and similar devices can be placed at various locations within a liquid fuel reformer in order to measure, monitor and control the operation of the liquid fuel reformer as more fully explained in connection with the control system illustrated in FIG. 2A.

In a start-up mode of operation of exemplary liquid fuel reformer 100, air at ambient temperature, introduced by blower 102 into conduit 103, passes through first heating zone 106, where the air is initially heated by first heater 107, for example, of the electrical resistance type, to within a preset, or targeted, first range of elevated temperature at a given rate of flow. The initially heated air then passes through heat transfer zone 108 which in the steady-state mode of operation of CPOX reformer 100 is heated by heat of exotherm recovered from the CPOX reaction occurring within CPOX reaction zones 110 of tubular CPOX reactor units 109. Once such steady-state operation of reformer 100 is achieved, i.e., upon the CPOX reaction within CPOX reactor units 109 becoming self-sustaining, the thermal output of first heater 107 can be reduced or its operation discontinued since the incoming air will have already been heated by passage through heat transfer zone 108 to within, or approaching, its first range of elevated temperature.

Continuing further downstream within conduit 103, the air which has initially been heated, either by passage through first heating zone 106 during a start-up mode of operation or by passage through heat transfer zone 108 during a steady-state mode of operation, passes through second heating zone 111 where it is further heated by second heater 112, which can also be of the electrical resistance type, to within a second range of elevated temperature. Second heater 112 operates to top-off the temperature of the previously heated air thereby satisfying several operational requirements of liquid fuel reformer 100, namely, assisting in the regulation and fine-tuning of the thermal requirements of the reformer on a rapid response and as-needed basis, providing sufficient heat for the subsequent vaporization of liquid reformable fuel introduced further downstream into conduit 103 and providing heated gaseous reforming reaction mixture.

Liquid reformable fuel, exemplified here and in the other embodiments of the present teachings by diesel, is continuously introduced from storage via pump 113 through fuel line 114 equipped with optional flow meter 115 and optional flow control valve 116 and into main conduit 103 where the fuel is vaporized by vaporizer system 117 utilizing heat from the heated air flowing from second heating zone 111. The vaporized, i.e., gaseous, fuel combines with the stream of heated air in liquid fuel vaporization zone 118 of conduit 103. A mixer, for example, a static mixer such as in-line mixer 119, and/or vortex-creating helical grooves formed within the internal surface of conduit 103, or an externally powered mixer (not shown), are disposed within a mixing zone (coincident with liquid fuel vaporization zone 118) of conduit 103 in order to provide a more uniform fuel-air gaseous CPOX reaction mixture than would otherwise be the case.

The heated vaporized fuel-air mixture (heated gaseous reforming reaction mixture) enters manifold, or plenum, 120 which functions to distribute the reaction mixture more evenly and, for example, at a more uniform temperature, into tubular CPOX reactor units 109. While the conduit and the manifold will ordinarily be surrounded by thermal insulation (e.g., insulation 310 of liquid fuel reformer 300 illustrated in FIG. 3A), the gaseous reforming reaction mixture can still undergo a drop in temperature due to heat loss through the walls of the manifold, which typically has a greater volume, and hence a greater wall surface area, than that of a comparable length of the conduit. Another factor that can cause a drop in the temperature of the gaseous reforming reaction mixture within a manifold is the reduction in pressure and velocity which the mixture undergoes as it exits the conduit and enters the larger space of the manifold.

Reductions in the temperature of a gaseous reforming reaction mixture due to either of these factors, particularly those occurring in regions of the reaction mixture that are proximate to or in contact with walls, corners and/or other recesses of the manifold, can induce localized condensation of vaporized fuel. To minimize the possibility of such condensation, a manifold can be provided with means for maintaining the temperature of the gaseous reforming reaction mixture above the condensation threshold of its vaporized fuel component. For example, as shown in FIG. 1A, heater 121, of the electrical resistance type, and thermocouple or thermistor probe 122 for purposes of temperature control, are disposed within manifold 120 in order to accomplish this objective. As an alternative to a heater or in addition thereto, a reformer can be provided with thermally conductive structure(s), (e.g., thermally conductive elements 334 of the liquid fuel reformer illustrated in FIG. 3A) for transferring heat of exotherm recovered from the CPOX reforming reaction(s) occurring within reforming reaction zones of tubular reforming reactor units to such locations within the manifold where the potential for condensation of fuel vapor can be greatest, for example, wall surfaces in the vicinity of the fuel-air outlets and/or other sites such as corners and other recesses of the manifold that could cause localized condensation of vaporized fuel.

From manifold 110, the heated reforming CPOX reaction mixture is introduced into tubular reforming reactor units 109. In a start-up mode of operation of liquid fuel reformer 100, igniter 123 initiates CPOX reforming reaction(s) of the gaseous reforming reaction mixture within reforming reaction zones 110 of tubular reforming reactor units 109 thereby commencing the production of hydrogen-rich reformate. Once steady-state reforming reaction temperatures have been achieved (e.g., 250° C. to 1,100° C. in the case of CPOX reforming), the reaction becomes self-sustaining and operation of the igniter can be discontinued. Thermocouples 124 and 125 are provided to monitor the temperatures of, respectively, the vaporization operation occurring within the vaporization zone 118 of conduit 103 and the reforming reaction occurring within tubular reforming CPOX reactor units 109, the temperature measurements being relayed as monitored parameters to reformer control system 126.

Reformer 100 can also include a source of electrical current, for example, rechargeable lithium-ion battery system 127, to provide power for its electrically driven components such as blower 102, flow meters 104 and 115, heaters 107, 112 and 121, liquid fuel pump 113, flow control valve 116, igniter 123, and thermocouples 105, 122, 124 and 125 and, if desired, to store surplus electricity for later use.

If desired, product effluent or hydrogen-rich reformate from liquid reformer 100 can be introduced into one or more conventional or otherwise known carbon monoxide removal devices 128 for the reduction of its carbon monoxide (CO) content, for example, where the product effluent is to be introduced as fuel to a fuel cell stack utilizing a catalyst that is particularly susceptible to poisoning by CO, for example, a polymer electrolyte membrane fuel cell. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa.

It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CO-reduction units such as the aforementioned WGS converter and/or PROX reactor.

Figure 1B:
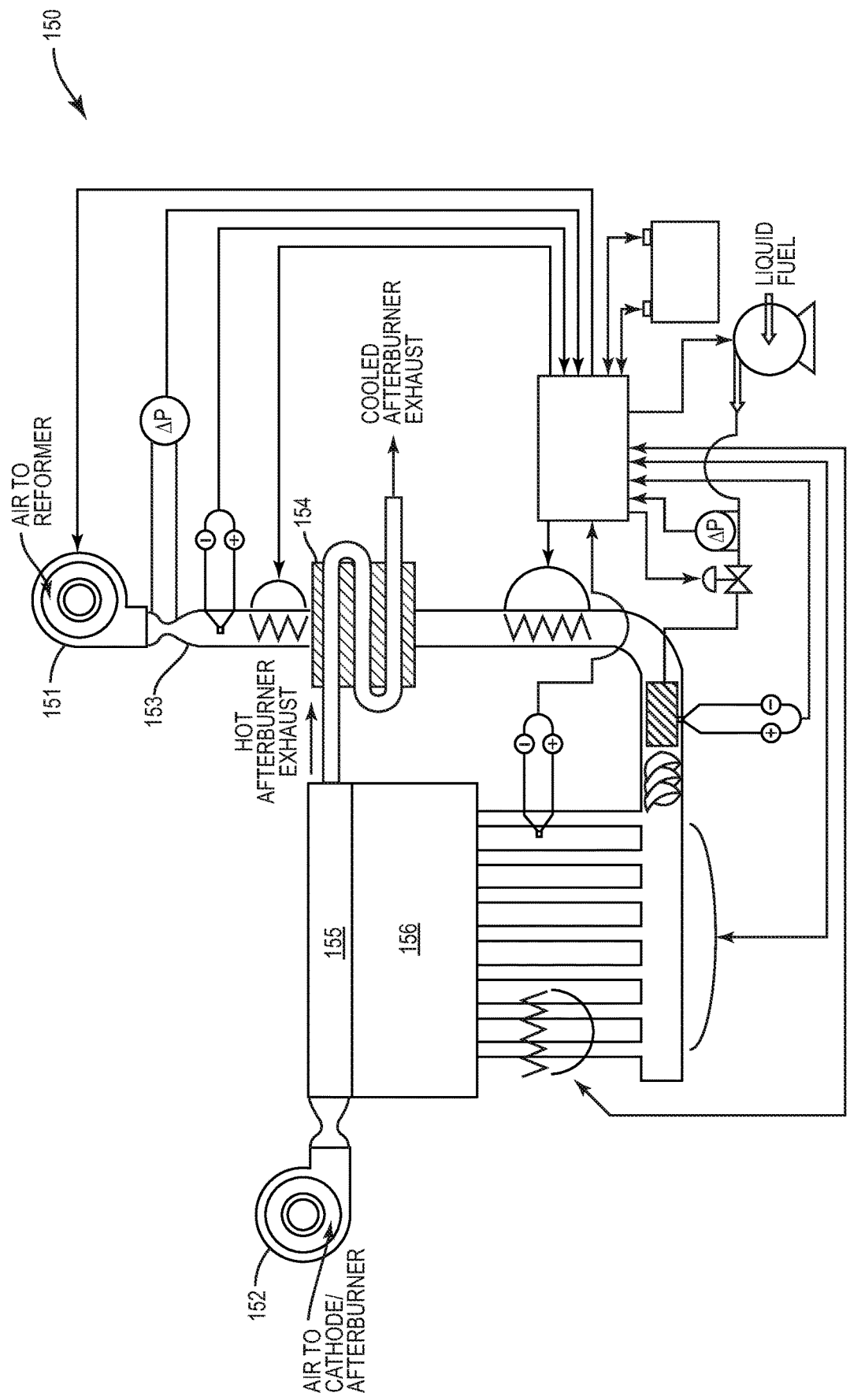

In contrast to liquid fuel reformer 100 of FIG. 1A in which air is heated within heat transfer zone 108 of conduit 103 by heat of exotherm recovered from CPOX reactor units 109 during a steady-state mode of operation, in exemplary liquid fuel CPOX reformer 150 of FIG. 1B, air introduced via centrifugal blower 151 into conduit 153 is heated by passage through heat exchanger 154 which is supplied with heat of exotherm recovered from a reformate-consuming device to which reformer 150 is connected, for example, fuel cell stack afterburner (tail gas burner) section 155 of fuel cell stack 156. In all other respects, the components of CPOX reformer 150 of FIG. 1B and their functions are essentially the same as those of CPOX reformer 100 of FIG. 1A. Even where a liquid fuel reformer does not generate an exotherm or a sufficient amount of exotherm to adequately preheat air introduced into conduit 103 during a steady-state mode of operation of the reformer (as is the case with a steam or autothermal reformer), heat resulting from the combustion of combustible components of tail gases within an afterburner section of a fuel cell to which such reformer is connected can provide the requisite heat for this purpose.

Figure 2A:
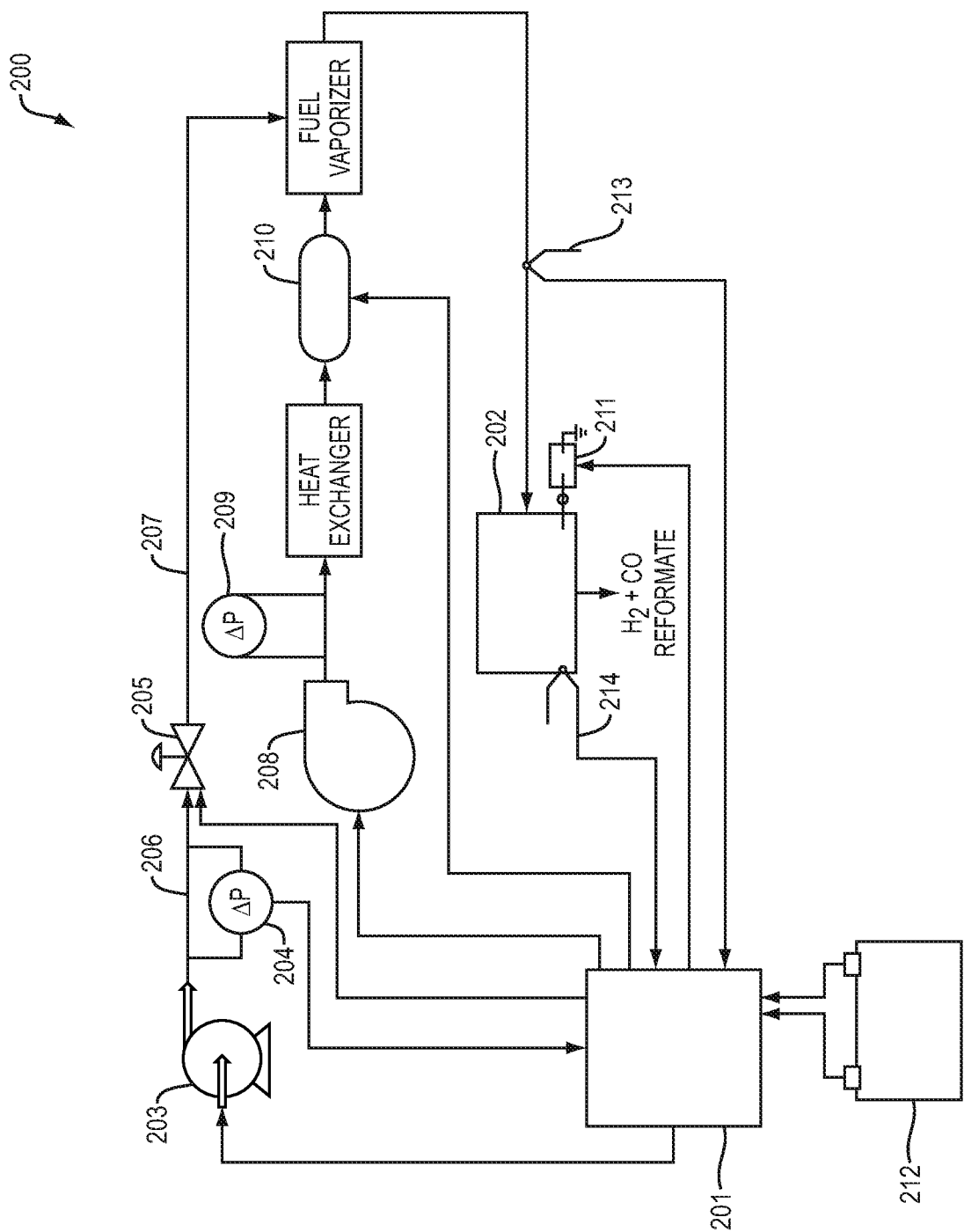
FIG. 2A is a schematic block diagram of an exemplary control system for managing the operations of the liquid fuel reformer of FIG. 1A.

Control system 200 illustrated in FIG. 2A is provided for controlling the operations of a liquid fuel reformer in accordance with the present teachings. As shown in FIG. 2A, control system 200 includes controller 201 to manage liquid fuel reformer 202 in its start-up, steady-state, and shut-down modes of operation. The controller can be software operating on a processor. However, it is within the scope of the present teachings to employ a controller that is implemented with one or more digital or analog circuits, or combinations thereof.

Control system 200 further includes a plurality of sensor assemblies, for example, fuel pressure meter 204, air pressure meter 209, mixing zone thermocouple 213 and CPOX reaction zone thermocouple 214, in communication with controller 201 and adapted to monitor selected operating parameters of CPOX reformer 202.

In response to input signals from the sensor assemblies, user commands from a user-input device and/or programmed subroutines and command sequences, controller 201 can manage the operations of a liquid fuel reformer in accordance with the present teachings. More specifically, controller 201 can communicate with a control signal-receiving portion of the desired section or component of a liquid fuel reformer by sending command signals thereto directing a particular action. Thus, for example, in response to flow rate input signals from pressure meters 204 and 209 and/or temperature input signals from thermocouples 213 and 214, controller 201 can send control signals to fuel pump 203 and/or fuel flow control valve 205, for example, to control the flow of fuel through fuel line 206 to conduit 207, to centrifugal blower 208 to control the flow of air into conduit 207 and drive the flow of heated gaseous CPOX reaction mixture within and through CPOX reformer 202, to heater 210 to control its thermal output, to igniter 211 to control its on-off states, and to battery/battery recharger system 212 to manage its functions.

The sensor assemblies, control signal-receiving devices and communication pathways herein can be of any suitable construction and of those known in the art. The sensor assemblies can include any suitable sensor devices for the operating parameters being monitored. For example, fuel flow rates can be monitored with any suitable flow meter, pressures can be monitored with any suitable pressure-sensing or pressure-regulating device, and the like. The sensor assemblies can also, but do not necessarily, include a transducer in communication with the controller. The communication pathways will ordinarily be wired electrical signals but any other suitable form of communication pathway can also be employed.

In FIG. 2A, communication pathways are schematically illustrated as single- or double-headed arrows. An arrow terminating at controller 201 schematically represents an input signal such as the value of a measured flow rate or measured temperature. An arrow extending from controller 201 schematically represents a control signal sent to direct a responsive action from the component at which the arrow terminates. Dual-headed pathways schematically represent that controller 201 not only sends command signals to corresponding components of liquid fuel reformer 202 to provide a determined responsive action, but also receives operating inputs from reformer 202 and mechanical units such as fuel pump 203, fuel control valve 205 and blower 208 and measurement inputs from sensor assemblies such as pressure meters 204 and 209 and thermocouples 213 and 214.

Figure 2B:
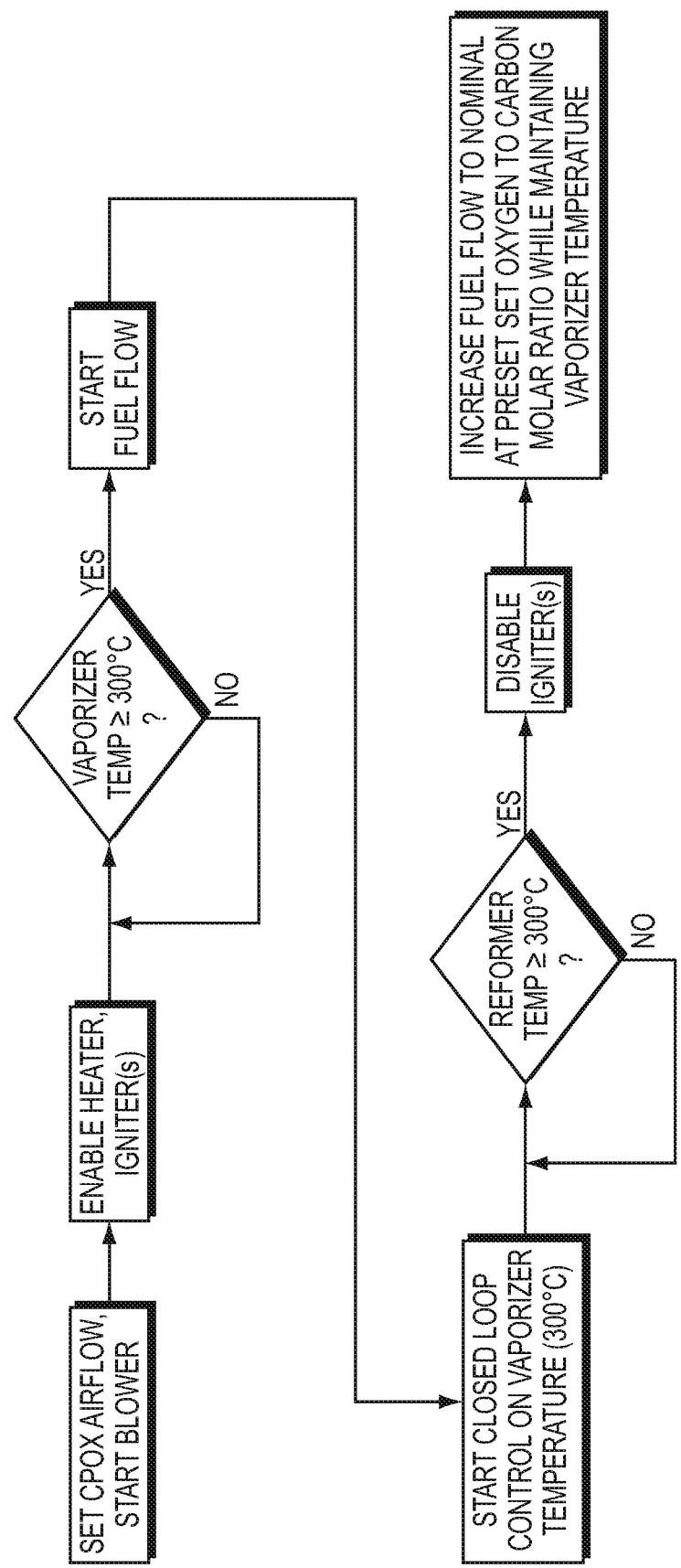
FIG. 2B is a flowchart of an exemplary control routine executed by a controller such as the control system illustrated in FIG. 2A.

FIG. 2B presents a flow chart of an exemplary control routine that can be executed by a controller of a control system to automate the operations of a liquid fuel reformer in accordance with the present teachings. The flow chart can be executed by a controller at a fixed interval, for example, every 10 milliseconds or so. The control logic illustrated in FIG. 2B performs several functions including the management of gaseous flows, heating, fuel vaporization and reforming reaction temperatures in start-up and steady-state modes of operation and management of the procedure for the shut-down mode of reformer operation.

As shown in the exemplary liquid fuel CPOX reformer 300 and components thereof illustrated in FIGS. 3A-3E, which are representative of further embodiments of the present teachings, air as an oxygen-containing gas is introduced at ambient temperature and at a preset mass flow rate via centrifugal blower 302 through inlet 303 of conduit 304, which includes a generally U-shaped conduit section favoring compact design. The ambient temperature air is initially heated in the start-up mode operation of the reformer to within a preset range of elevated temperature by passage through first heating zone 305 supplied with heat from electric heater 306 which can be of a conventional or otherwise known electrical resistance type rated, for example, at from 10 to 80 watts or even greater depending upon designed range of fuel processing capacity of reformer 300. Electrical resistance heaters are capable of raising the temperature of ambient air introduced into a conduit to a desired level for a relatively wide range of CPOX reformer configurations and operating capacities. During the steady-state mode of operation of reformer 300, electric heater 306 can be shut off, the air introduced into conduit 304 then being initially heated within second heating zone 307 by heat of exotherm recovered from CPOX reaction zones 309 of elongate tubular gas-permeable CPOX reactor units 308, for example, of the structure and composition described above in connection with CPOX reactor units 109 of FIG. 1A. In this manner, the temperature of the air introduced into conduit 304 can be increased from ambient to within some preset elevated range of temperature with the particular temperature being influenced by a variety of design, i.e., structural and operational, factors as those skilled in the art will readily recognize.

Thermal insulation 310, for example, of the microporous or alumina-based refractory type, surrounds most of conduit 304 and those portions of CPOX reactor units 308 corresponding to their CPOX reaction zones 309 in order to reduce thermal losses from these components.

To raise the temperature of the air that had been initially heated by passage through first heating zone 305 in a start-up mode or through second heat zone 307 in a steady-state mode, as the initially heated air continues to flow downstream in conduit 304, it advantageously flows through optional third heating zone 312 supplied with heat from optional second electric heater unit 313. Because optional second electric heater unit 313 need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system and its tubular CPOX reactor units.

Figure 3A:
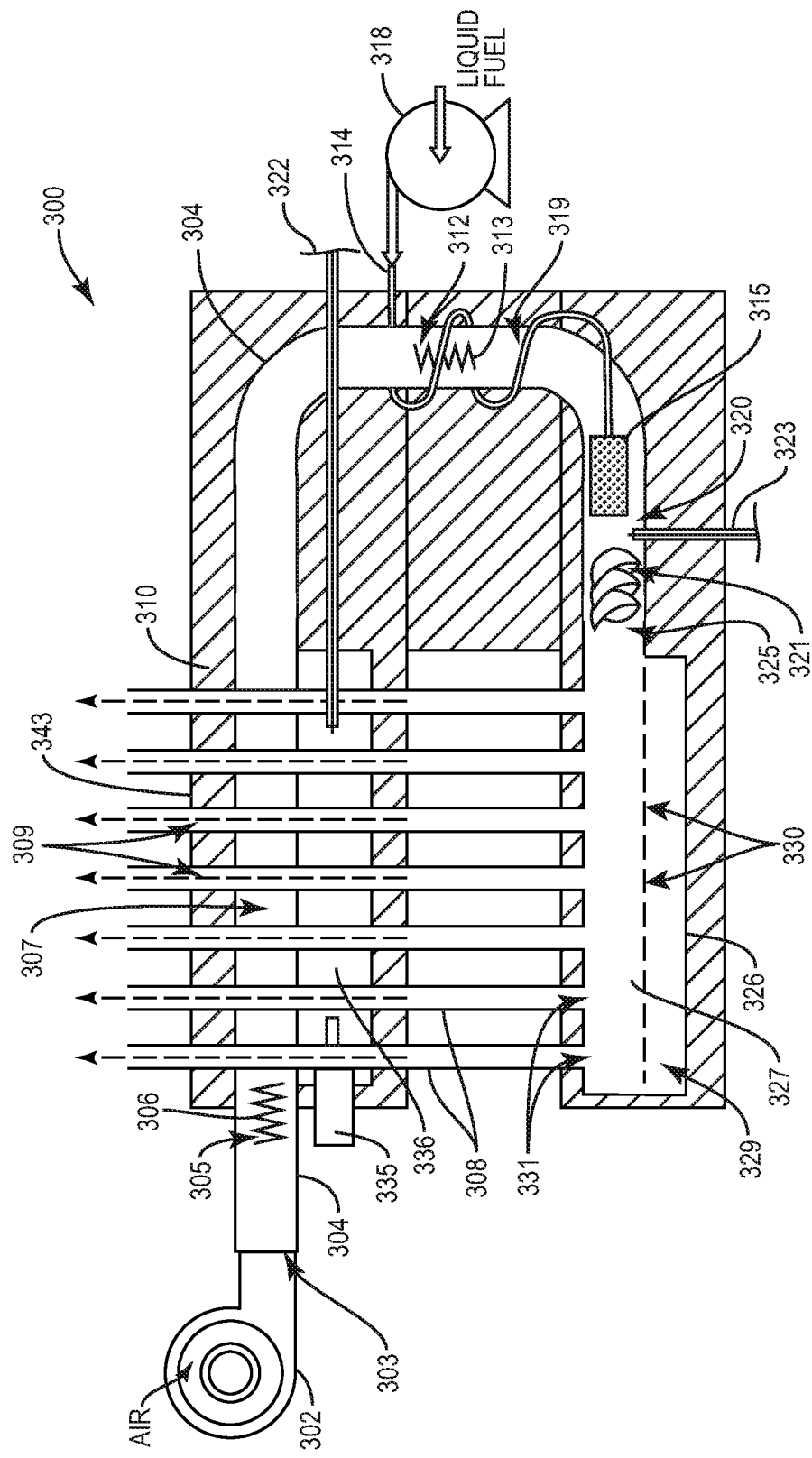
FIG. 3A is a longitudinal cross section view of an embodiment of liquid reformer in accordance with the present teachings.
Figure 3B:
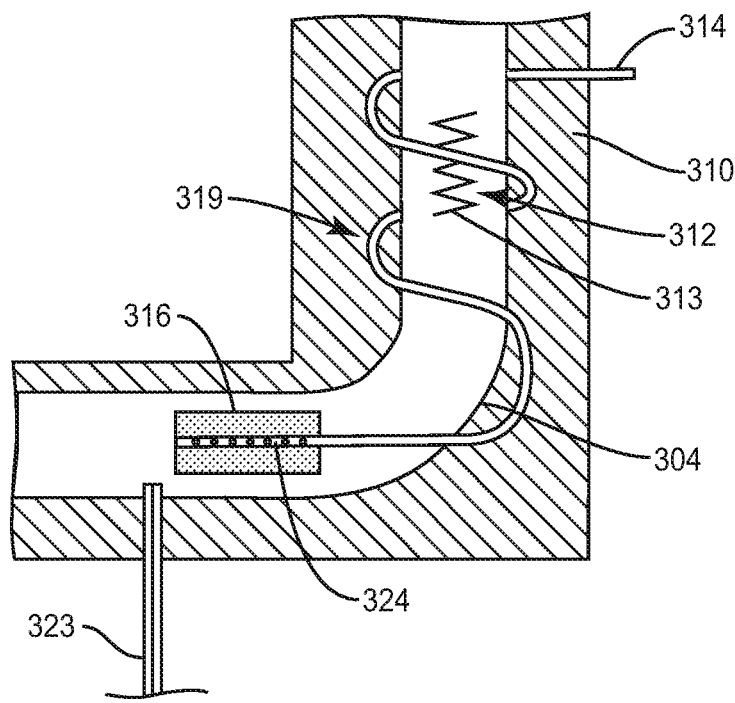
FIG. 3B is an enlarged longitudinal cross section view of the liquid fuel vaporizer system of the liquid fuel reformer illustrated in FIG. 4A.
Figure 3C:
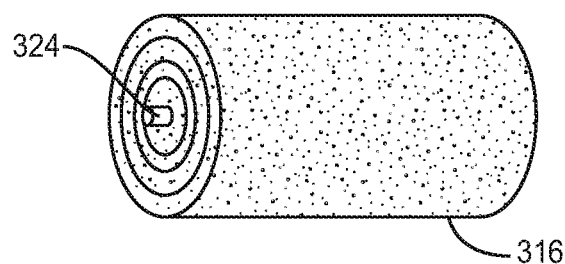
FIGS. 3C to 3E are, respectively, enlarged perspective and longitudinal cross section views of an embodiment of a fuel spreader component of the liquid fuel vaporizer system of the liquid fuel reformer illustrated in FIGS. 3A and 3B.
Figure 3D:
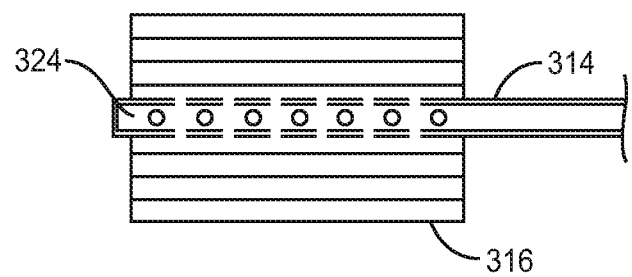
Figure 3E:
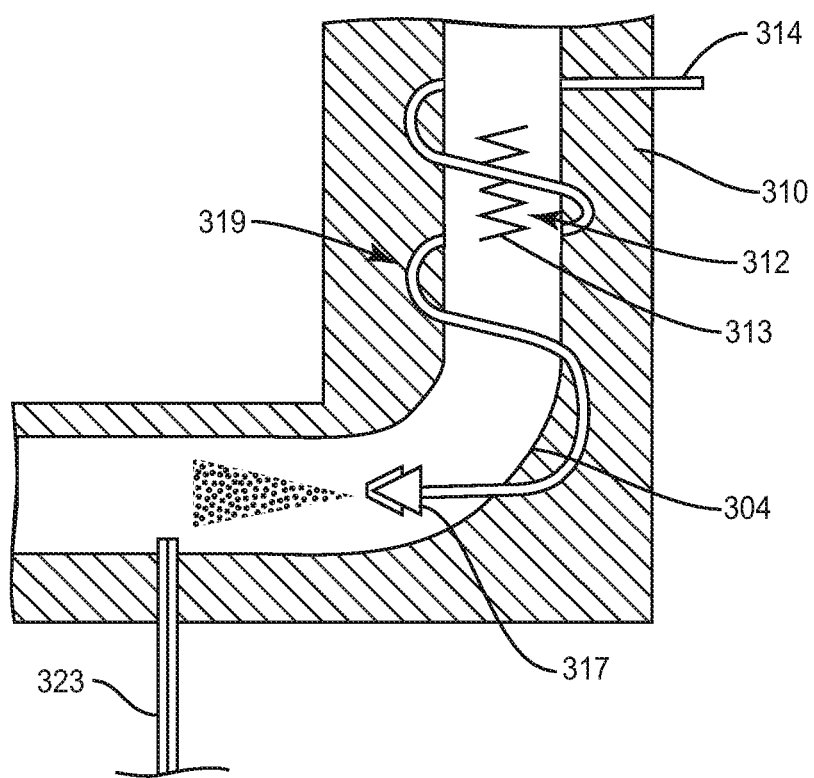

A liquid reformable fuel such as any of those mentioned above, and exemplified in this and the other embodiments of the present teachings by automotive diesel, is introduced via fuel line 314 terminating within conduit 304 in liquid fuel spreader device 315, for example, wick 316 shown in FIGS. 3B-3D, or spray device 317 shown in FIG. 3E.

Any conventional or otherwise known pump or equivalent device 318 for passing fluid through the passageways and conduits of a liquid fuel CPOX reformer, for example, for introducing liquid fuel through fuel line 314 into conduit 304, can be used. For example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like, can be utilized for this purpose. In some embodiments, pump or equivalent device 318 can deliver the fuel on an intermittent or pulsed flow basis. In certain embodiments, a pump or equivalent device can deliver the fuel as a substantially continuous flow. In particular embodiments, a pump or equivalent device can make rapid adjustments in fuel flow rate in response to changing CPOX reformer operating requirements.

As indicated above, the pressurized liquid fuel can be spread within a conduit by a wick or as a fine spray or otherwise in droplet form by any of such conventional or otherwise known spray devices as fuel injectors, pressurized nozzles, atomizers (including those of the ultrasonic type), nebulizers, and the like.

Heat produced by electric heater 306 within first heating zone 305 in a start-up mode or heat of exotherm recovered from CPOX within second heating zone 307 during a steady-state mode, combined, if desired, with heat produced by optional second electric heater 313 within optional heating zone 312 function in unison to vaporize the liquid fuel introduced into conduit 304 and together constitute the principal components of the fuel vaporizer system of a reformer.

Optional second electric heater 313 operates to not only incrementally raise the temperature of the initially heated ambient temperature air passing within its associated optional third heating zone but can also be used to heat the liquid fuel prior to its introduction into conduit 304 thereby facilitating the vaporization of the fuel once it enters the conduit. This optional provision for heating liquid fuel prior to its introduction into the conduit can make it possible to vaporize a given amount of liquid reformable fuel faster, or a greater amount of liquid fuel within a given time period, than the same vaporizer system operating upon reformable fuel which is at ambient temperature at the time it enters conduit 304.

To provide for the heating of the liquid fuel before it enters main conduit 304 and as shown in the vaporizer system, or assembly, illustrated in FIGS. 3B-3E, fuel line 314 traverses the wall of conduit 304 with section 319 of the fuel line being extended in length to prolong the residence time of fuel flowing therein where the fuel line passes through, or is proximate to, optional third heating zone 312 of main conduit 304. An extended fuel line section can assume a variety of configurations for this purpose, for example, a coiled or helical winding (as shown) or a series of lengthwise folds, disposed on or proximate to the exterior surface of a conduit corresponding to a second heating zone or any similar such configuration disposed within the interior of the conduit at or near the second heating zone. Regardless of its exact configuration and/or disposition, extended fuel line section 319 must be in effective heat transfer proximity to optional third heating zone 312 so as to receive an amount of heat sufficient to raise the temperature of the fuel therein to within some preset range of temperature. Thus, a portion of the thermal output of optional second electric heater 313 within third heating zone 312 of conduit 304, in addition to further heating air flowing within this zone, will transfer to fuel, for example, diesel fuel, flowing within the distal section 319 of fuel line 314, which distal section of fuel line 314 can be lengthened or extended as shown by reference numeral 319, thereby raising its temperature to within the preset range. Whichever range of temperature values is chosen for the fuel within the fuel line, it should not exceed the boiling point of the fuel (from 150° C. to 350° C. in the case of diesel) if vapor lock and consequent shut-down of reformer 300 are to be avoided.

Liquid fuel spreader 315 is disposed within conduit 304 downstream from optional third heating zone 312 and associated optional second electric heater 313 and upstream from mixing zone 320. Thermocouple 322 disposed within chamber 436 and thermocouple 323 is disposed within mixing zone 320 to monitor, respectively, the temperatures of CPOX reforming occurring within CPOX reaction zones 309 of CPOX reactor units 308 and the temperature of the vaporized fuel-air mixture.

Figure 4A:
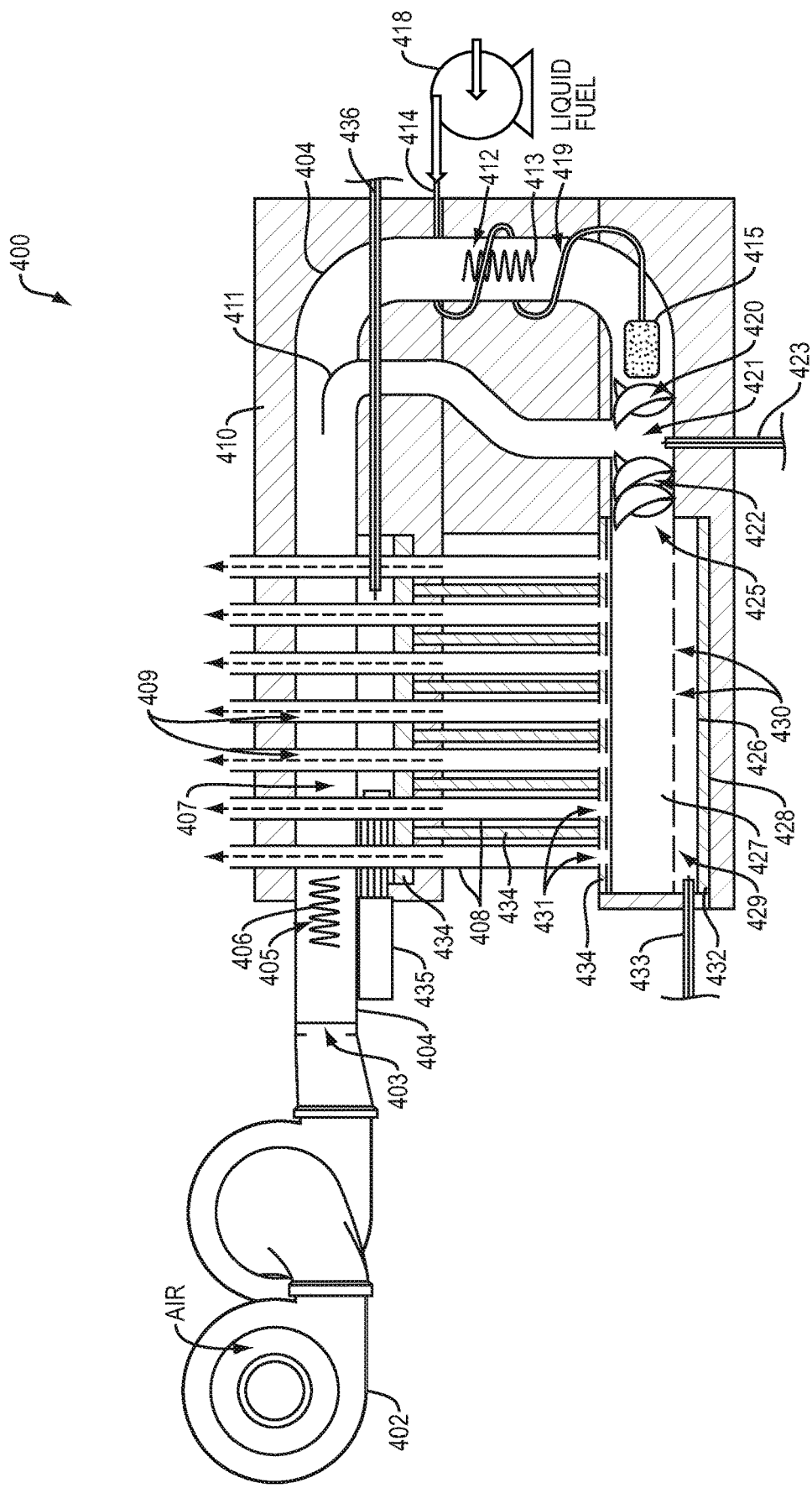
FIG. 4A is a longitudinal cross section view of another embodiment of a liquid fuel reformer in accordance with the present teachings.

As shown in the various views of exemplary liquid fuel reformer 400 and illustrated in FIG. 4A, which is representative of a further embodiment of the present teachings, air as an oxygen-containing gas is introduced at ambient temperature and at a preset mass flow rate via centrifugal blower system 402 through inlet 403 of main conduit 404, which includes a generally U-shaped conduit section favoring compact design. The ambient temperature air is initially heated in the start-up mode operation of the reformer to within a preset range of elevated temperature by passage through first heating zone 405 supplied with heat from first heater unit 406. First heater unit 406 and second heater unit 413 downstream therefrom can be of a conventional or otherwise known electrical resistance type rated, for example, at from 10 to 80 watts or even greater depending upon designed range of fuel processing capacity of the reformer. Such heaters are capable of raising the temperature of ambient air introduced into a conduit to a desired level for a relatively wide range of liquid fuel reformer configurations and operating capacities. During the steady-state mode of operation of reformer 400, first heater unit 406 can be shut off, the air introduced into main conduit 404 then being initially heated within heat transfer zone 407 by heat of exotherm recovered from CPOX reaction zones 409 of tubular gas-permeable reformer reactor units 408. In this manner, the temperature of the air introduced into a conduit can be increased from ambient to within some preset elevated range of temperature with the particular temperature being influenced by a variety of design, i.e., structural and operational, factors as those skilled in the art will readily recognize.

Thermal insulation 410, for example, of the microporous or alumina-based refractory type, surrounds most of main conduit 404 and those portions of reformer reactor units 408 corresponding to their reforming reaction zones 409 in order to reduce thermal losses from these components.

As the heated air stream flows downstream within main conduit 404, it can be split, or divided, into two streams with one stream continuing to course through main conduit 404 and the other stream being diverted into branch conduit 411 from which it exits to re-enter main conduit 404 at merger zone 421 there to merge with vaporized fuel-air mixing passing from first mixing zone 420 (having a first static mixer and/or a helically-grooved internal wall surface disposed therein). The merged gases then enter second mixing zone 422 (likewise having a second static mixture and/or a helically-grooved internal wall surface disposed therein) to provide a gaseous reforming reaction mixture of fairly uniform composition for introduction through outlet 425 into gas distributor 427 of manifold 426, the structure and operation of which are more fully described herein.

By splitting the total amount of air for the desired reforming reaction into two streams, the amount of vaporized liquid fuel component contained in the fuel-air mixture that starts to form as just-vaporized fuel and heated air begin to combine can be kept high in proportion to the oxygen content of the air component thus eliminating or reducing the possibility that some region(s) of this non-uniform initial fuel-air mixture will contain a concentration of oxygen that is sufficiently high to support combustion/ignition and consequent coke formation. Once the initial fuel-air mixture passes through the first static mixer disposed within a first mixing zone thereby attaining a degree of compositional uniformity that makes the presence of ignition-inducing regions of relatively high oxygen concentration much less likely, the somewhat more uniform fuel-air mixture can then merge with the second heated air stream exiting branch conduit 411 at a merger zone thereby satisfying the preset O to C molar ratio of the desired gaseous reforming reaction mixture. This fuel-air mixture can then flow through the second static mixer disposed within a mixing zone to provide a more compositionally uniform gaseous reforming reaction mixture just prior to the mixture entering a gas distributor of a manifold.

To raise the temperature of the air that had been initially heated by passage through first heating zone 405 and/or heat transfer zone 407, as the initially heated air continues to flow downstream in main conduit 404, the initially heated air is routed through second heating zone 412 supplied with heat from second heater unit 413. Because the second heater unit need only increase the temperature of the initially heated air by a relatively small extent, it can function as an incremental heater capable of making the typically small adjustments in air temperature that are conducive to precise and rapid thermal management of the reformer both with regard to the functioning of its fuel vaporization system, described herein, and its tubular reformer reactor units.

A liquid reformable fuel such as any of those mentioned above, and exemplified in this and the other embodiments of the present teachings by diesel fuel, is introduced via fuel line 414 terminating within main conduit 404 in liquid fuel spreader device 415, for example, wick 416 or a spray device (not shown). In operation, wick 416 draw up diesel fuel discharged through the fuel outlet by means of a wicking or capillary action. The diesel drawn up to and upon the surface of wick 416 can thereupon vaporize on contact with heated air flowing downstream from a second heating zone and begin to combine with the heated air to initially form a non-uniform gaseous fuel-air mixture, i.e., a non-uniform gaseous reforming reaction mixture. This initial fuel-air mixture following passage through the first static mixer within first mixing zone 420 then merges with the remaining complement of heated air flowing from branch conduit 411 into merger zone 421 and from there the merged streams flow into the second static mixer within second mixing zone 422 from which there exits a more compositionally uniform gaseous reforming reaction mixture.

Any conventional or otherwise known pump device 418 can be utilized for introducing liquid fuel through fuel line 414 into main conduit 404, for example, a metering pump, rotary pump, impeller pump, diaphragm pump, peristaltic pump, positive displacement pump such as a gerotor, gear pump, piezoelectric pump, electrokinetic pump, electroosmotic pump, capillary pump, and the like. As indicated above, the pressurized liquid fuel can be spread within a conduit by a wick or as a fine spray or otherwise in droplet form by any of such conventional or otherwise known spray devices as fuel injectors, pressurized nozzles, atomizers (including those of the ultrasonic type), nebulizers, and the like. A second heater unit and a fuel spreader device can function in unison to vaporize the liquid fuel introduced into the conduit and together constitute the principal components of the fuel vaporizer system of a reformer. In some embodiments, a pump or equivalent device can deliver the fuel on an intermittent or pulsed flow basis. In other embodiments, a pump or equivalent device can deliver the fuel as a substantially continuous flow. In particular embodiments, a pump or equivalent device can make rapid adjustments in fuel flow rate in response to changing reformer operating requirements.

Although a reformer can use any source of heat for driving vaporization of the liquid fuel during the start-up mode of operation, for example, a heater of the electrical resistance type (as in the case of heaters 406 and 413), especially where vaporization of the fuel is made to take place outside main conduit 404, liquid fuel reformer 400 illustrated employs heater 413 to not only incrementally raise the temperature of the initially heated ambient temperature air but to heat the liquid fuel prior to its introduction into the main conduit 404 and to provide sufficient heat for vaporizing the fuel once it enters the conduit. This optional provision for heating liquid fuel prior to its introduction into main conduit 404 can make it possible to vaporize a given amount of liquid reformable fuel faster, or a greater amount of liquid fuel within a given time period, than the same vaporizer system operating upon reformable fuel which is at ambient temperature at the time it enters the conduit.

To provide for the heating of the liquid fuel before it enters main conduit 404, fuel line 414 traverses the wall of main conduit 404 with section 419 of the fuel line being extended in length to prolong the residence time of fuel flowing therein where the fuel line passes through, or is proximate to, second heating zone 412 of main conduit 404. An extended fuel line section can assume a variety of configurations for this purpose, for example, a coiled or helical winding (as shown) or a series of lengthwise folds, disposed on or proximate to the exterior surface of main conduit 404 corresponding to second heating zone 412 or any similar such configuration disposed within the interior of the conduit at or near the second heating zone. Regardless of its exact configuration and/or disposition, extended fuel line section 419 must be in effective heat transfer proximity to second heating zone 412 so as to receive an amount of heat sufficient to raise the temperature of the fuel therein to within some preset range of temperature. Thus, a portion of the thermal output of heater 413 within second heating zone 412 of main conduit 404, in addition to further heating air flowing within this zone, will transfer to fuel, for example, diesel fuel, flowing within the distal section 419 of fuel line 414, which distal section of fuel line 414 can be lengthened or extended as shown by section 419, thereby raising its temperature to within the preset range. Whichever range of temperature values is chosen for the fuel within the fuel line, it should not exceed the boiling point of the fuel (from 150° C. to 450° C. in the case of diesel) if vapor lock and consequent shut-down of reformer 400 are to be avoided.

Liquid fuel spreader 415 is disposed within main conduit 404 downstream from second heating zone 412 and associated heater 413 and upstream from first mixing zone 420. Thermocouple 423 is disposed within main conduit 404 downstream from the vaporizer in order to monitor the temperature of the vaporized fuel-air mixture beginning to form therein. Liquid fuel spreader 415 can be configured as a wick 316 described in FIGS. 3B-3D.

The body of wick 316, which can be fit over a liquid fuel outlet, can be fabricated from any suitable heat-resistant material. Examples of useful heat-resistant materials include metal, ceramic, high temperature polymer, and the like, and combinations thereof such as a spirally wound sheet of interwoven metal or carbon fibers (for imparting structural strength) and ceramic fibers (for wicking action).

In the liquid fuel vaporizer systems described herein, there is little or no opportunity for the diesel to come into direct contact with a heated surface, for example, that of an electrical resistance heater element, that would pose a risk of raising the temperature of the diesel fuel to or above its flash point, to cause spattering of the fuel rather than its vaporization and/or cause pyrolysis of the fuel resulting in coke formation. Thus, the temperature of the diesel fuel can be readily and reliably maintained at a level below its flash point and without significant incidents of spattering or coking.

Referring again to FIG. 4A, following its passage through the second static mixer disposed within second mixing zone 422, gaseous reaction mixture exits main conduit 404 through outlet 425 and enters gas distributor 427 of manifold 426 which is configured to provide a more uniform distribution of the reaction mixture to, and within, tubular reforming reactor units 408. Such an arrangement or other arrangement within the present teachings can provide a distribution of gaseous reforming reaction mixture where the difference in flow rate of the gaseous reforming reaction mixture within any two reforming reactor units is not greater than about 20 percent, for example, not greater than about 10 percent, or not greater than about 5 percent.

Figure 4B:
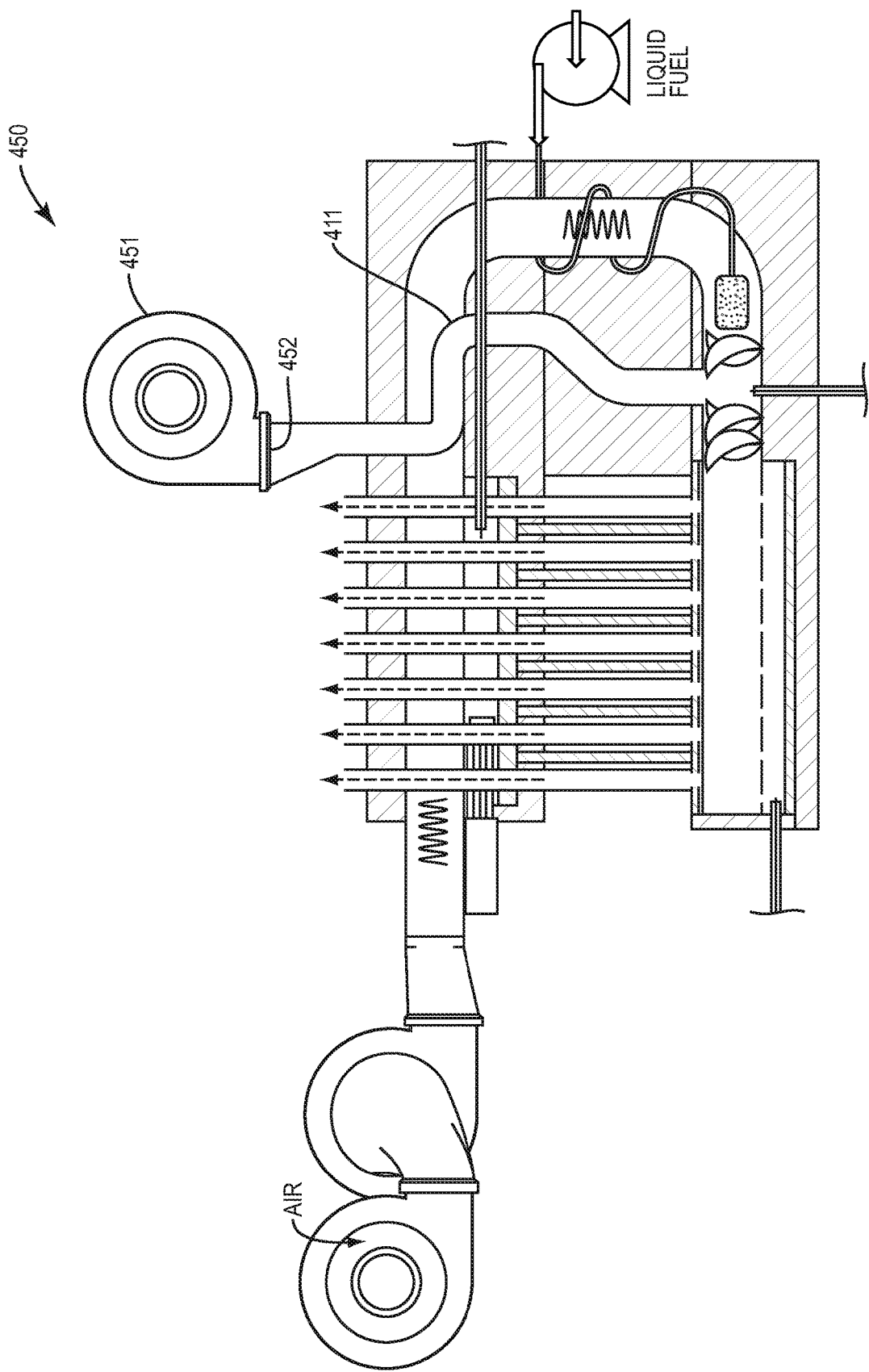
FIG. 4B is a longitudinal cross section view of a variant of the liquid fuel reformer illustrated in FIG. 4A.

Manifold 426 together with associated tubular reforming reactor units 408 includes manifold housing, or enclosure, 428 defining manifold chamber 429 within which heated gaseous reforming reaction mixture (gas) distributor 427 is connected to outlet 425 of main conduit 404. Heated gaseous reforming reaction mixture exiting main conduit 404 through outlet 425 enters gas distributor 427 thereafter passing outwardly through apertures (e.g., holes or slots) 440 located at the bottom or lower part of the gas distributor, the gas then flowing around the exterior surface of the distributor to its top or upper part and from there into inlets 441 of tubular reforming reactor units 408. The path of the gaseous reforming reaction mixture as it passes through apertures 440 and into inlets 441 is shown in FIG. 4B.

To eliminate or lessen the possibility that the temperature within some region(s) and/or surface(s) of manifold chamber 429 will fall to or below the condensation temperature of the vaporized liquid reformable fuel of the gaseous reforming reaction mixture present therein, electrical resistance heater 442 and thermocouple 423 can be disposed within manifold chamber 429, for example, on one or more of its internal surfaces or embedded within one or more of its walls, to provide an active heater system for maintaining the temperature within the chamber above the fuel condensation temperature. In addition to an active heater system, for example, as described above, or as an alternative thereto, a passive heat transfer system comprising thermally conductive elements 424, for example, fabricated from a good conductor of heat such as copper, thermally linking reforming reaction zones 409 of tubular reformer reactor units 408 with manifold chamber 429 can be arranged within reformer 400 to convey heat of exotherm from reforming reaction zones 409 to regions and/or surfaces within manifold chamber 429 so as to maintain the temperature of the vaporized fuel therein above its condensation temperature.

In addition to their function of preventing or minimizing the occurrence of fuel condensation, such active and/or passive heating systems can serve to make the temperature of the gaseous reforming mixture more uniform as it is introduced into inlets of reformer reactor units with consequent benefits for both reformer operation and control. Thus, for example, one or both manifold heating systems can be operated to provide a gaseous reforming reaction mixture of consistently uniform temperature throughout a manifold chamber such that there will be not more than about a 10% difference, for example, not more than about a 5% difference, in the temperature of gaseous reforming reaction mixture entering any two tubular reforming reactor units.

From manifold 426, heated gaseous reforming reaction mixture enters inlets 431 of reforming reactor units 408 and into reforming reaction zones 409 where the reaction mixture undergoes a gaseous phase CPOX reaction to produce a hydrogen-rich, carbon monoxide-containing reformate. In the start-up mode, one or more igniters 435 initiates reforming. After reforming becomes self-sustaining, for example, when the temperature of the reaction zone reaches from about 250° C. to about 1100° C., the igniter(s) can be shut off as external ignition is no longer required to maintain the now self-sustaining reforming reaction(s).

Exemplary liquid fuel reformer 450 of FIG. 4B is a variant of reformer 400 of FIG. 4A. As shown in FIG. 4B, a flow of oxygen-containing gas is introduced into liquid fuel reformer 450 at external inlet 452 of branch conduit 411 in contrast to the inlet of branch conduit 411 in the reformer of FIG. 4A which is disposed within main conduit 411. In all other respects, reformers 400 and 450 are essentially the same and their operation essentially the same.

Figure 5:
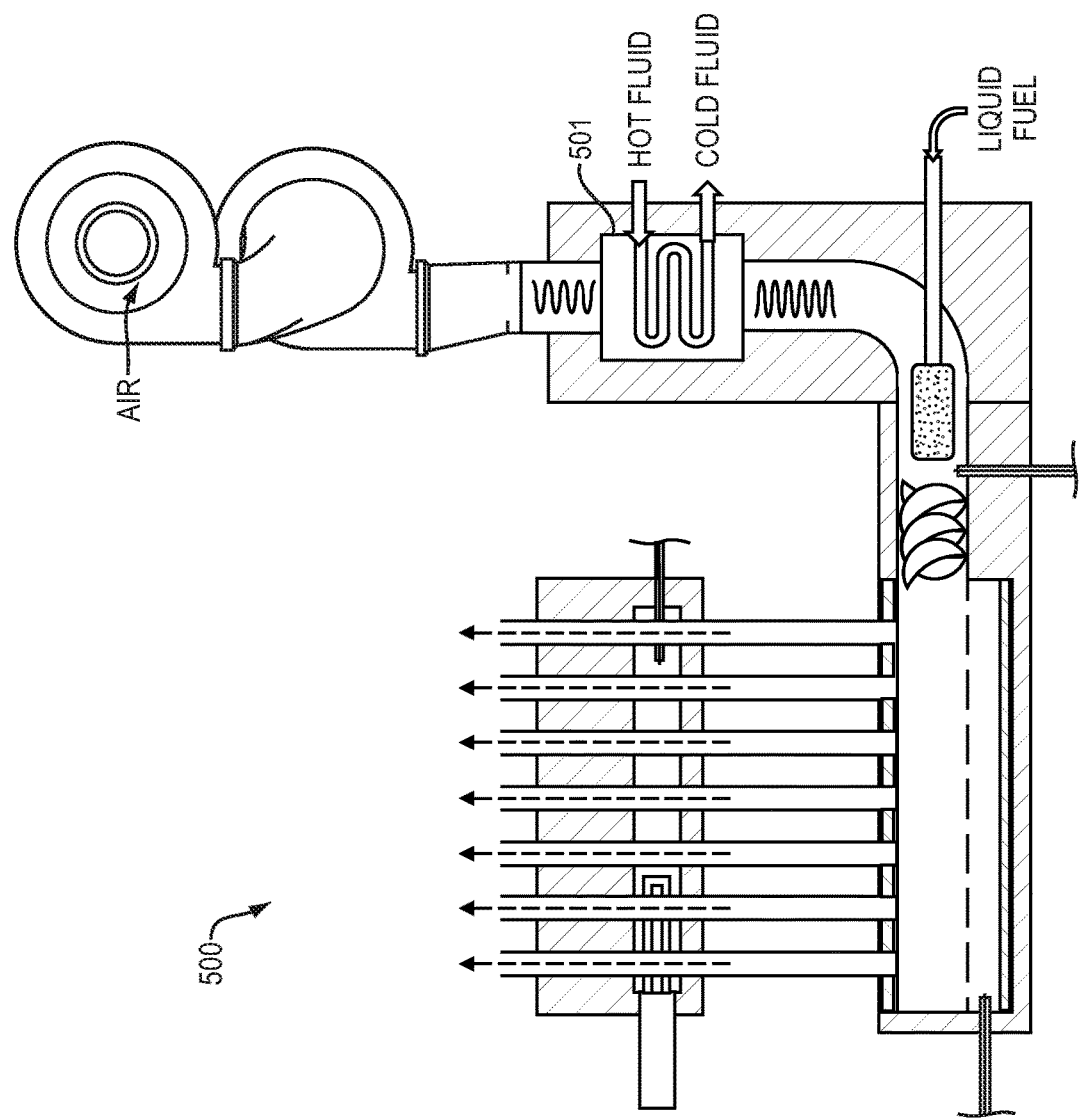
FIG. 5 is a longitudinal cross section view of an additional embodiment of liquid fuel reformer in accordance with the present teachings featuring external heating of oxygen-containing gas and/or liquid reformable fuel during the steady-state mode of operation of the reformer.

Liquid fuel reformer 500 of FIG. 5 includes most of the elements and features of, and operates in essentially the same way as, liquid fuel reformer 300 of FIG. 3A and therefore will be described only in respect of significant differences from the latter.

In liquid fuel reformer 500, a pressurized flow of ambient temperature air provided by the centrifugal blower system shown is introduced into, and passes through, heat exchanger 501 through which is circulated a flow of heat exchange fluid, for example, hot combustion gases from an external heat-producing source such as the afterburner section of a fuel cell stack (not shown). This arrangement differs from the provision for heating air in liquid fuel reformer 300 in which ambient air entering the reformer during the steady-state mode of operation of the reformer passes through heat transfer zone 307 of main conduit 304, the air being heated within zone 307 by heat recovered from the exotherm of the reforming reaction occurring within reforming reaction zones 309 of reformer reactor units 308. In addition, in contrast to the fuel heating system shown in FIG. 3A in which fuel flowing within fuel line section 314 is heated by heater 313, in liquid fuel reformer 500, a section of fuel line can be routed through heat exchanger 501, to similarly provide heating of the fuel prior to its vaporization. In all other respects, liquid fuel reformer 500 can operate in essentially the same way as liquid reformer 300.

Means for cooling a liquid fuel reformer of the present teachings, while optional, can be useful in providing further thermal management and control of the reformer. To provide such further degree of reformer control, liquid fuel reformers 600 and 650 of, respectively, FIGS. 6A and 6B, include heat exchangers for cooling their reformer reactor units to within a preset range of temperature, for example, from about 750° to about 950° C.

Figure 6A:
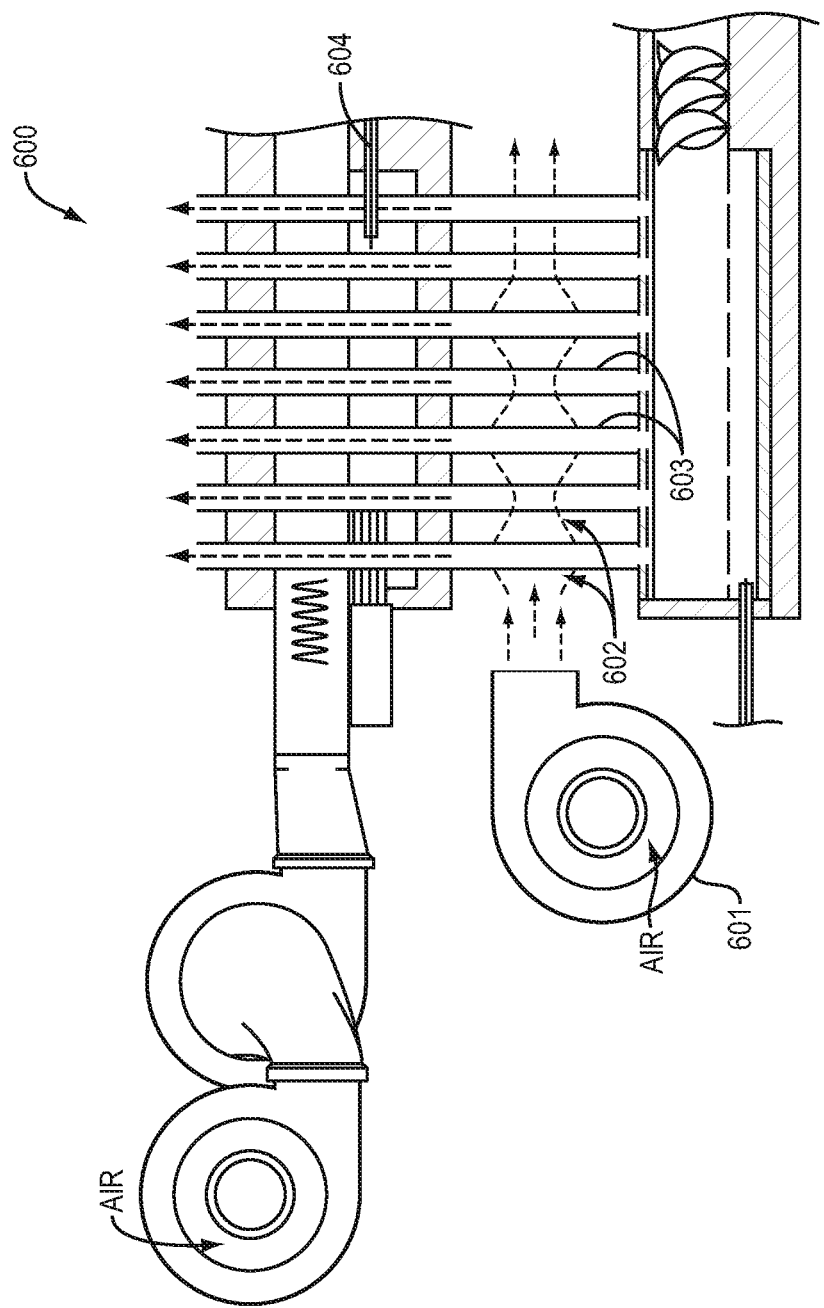
FIGS. 6A and 6B are, respectively, longitudinal cross section and plan cross section views of embodiments of heat exchanger structure in controlling the temperature within the CPOX reaction zones of the CPOX reactor units illustrate in FIGS. 4A and 5.

As shown in FIG. 6A, liquid fuel reformer 600 includes centrifugal blower 601 for directing a coolant stream, for example, air at ambient temperature, against the exposed exterior surfaces of lower sections 602 of reformer reactor units 603. In place of a centrifugal blower, any other suitable device for providing a coolant stream can be utilized, for example, a fan, an impeller, and the like.

Figure 6B:
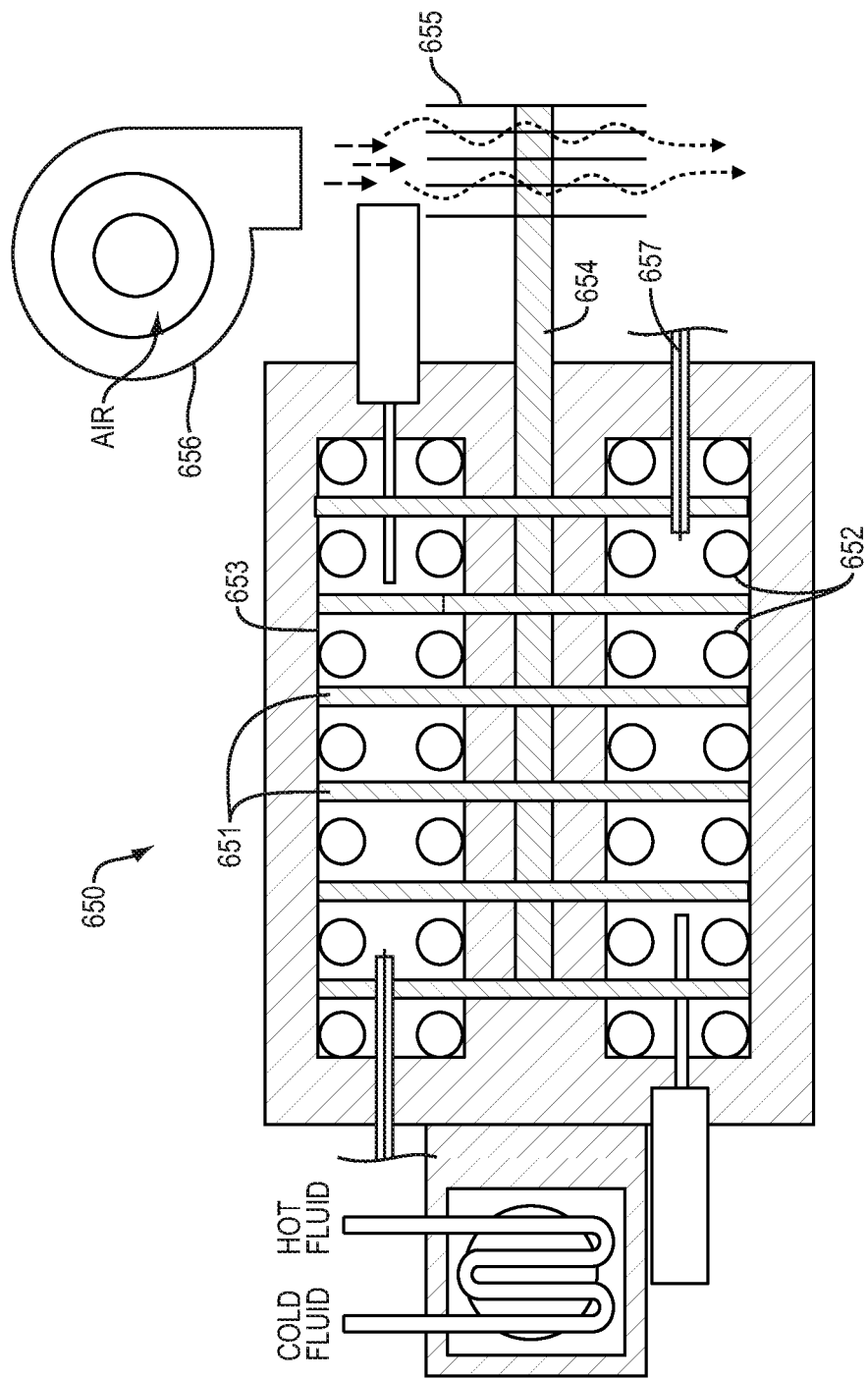

In liquid fuel reformer 650 of FIG. 6B, a heat conducting assembly includes variously configured and arranged heat-conducting members 651 and 654. Heat-conducting members can be provided, for example, as rods, plates, tubes, and the like, fabricated from materials having suitably high thermal conductivity, for example, metals (particularly copper and copper alloys), carbons, ceramics and composites, and the like. Heat-conducting members can conduct radiant heat, for example, heat radiated from the exposed exterior surfaces of reformer reactor units 652 within chamber 653 to heat-conducting member 654, likewise fabricated from a material exhibiting high thermal conductivity such as copper, terminating in heat-radiative member 655, for example, the series of fins shown. Centrifugal blower unit 656 directs a coolant stream, for example, air at ambient temperature, against multiple fin-bearing heat-radiative member 655 to dissipate its heat.

Figure 7:
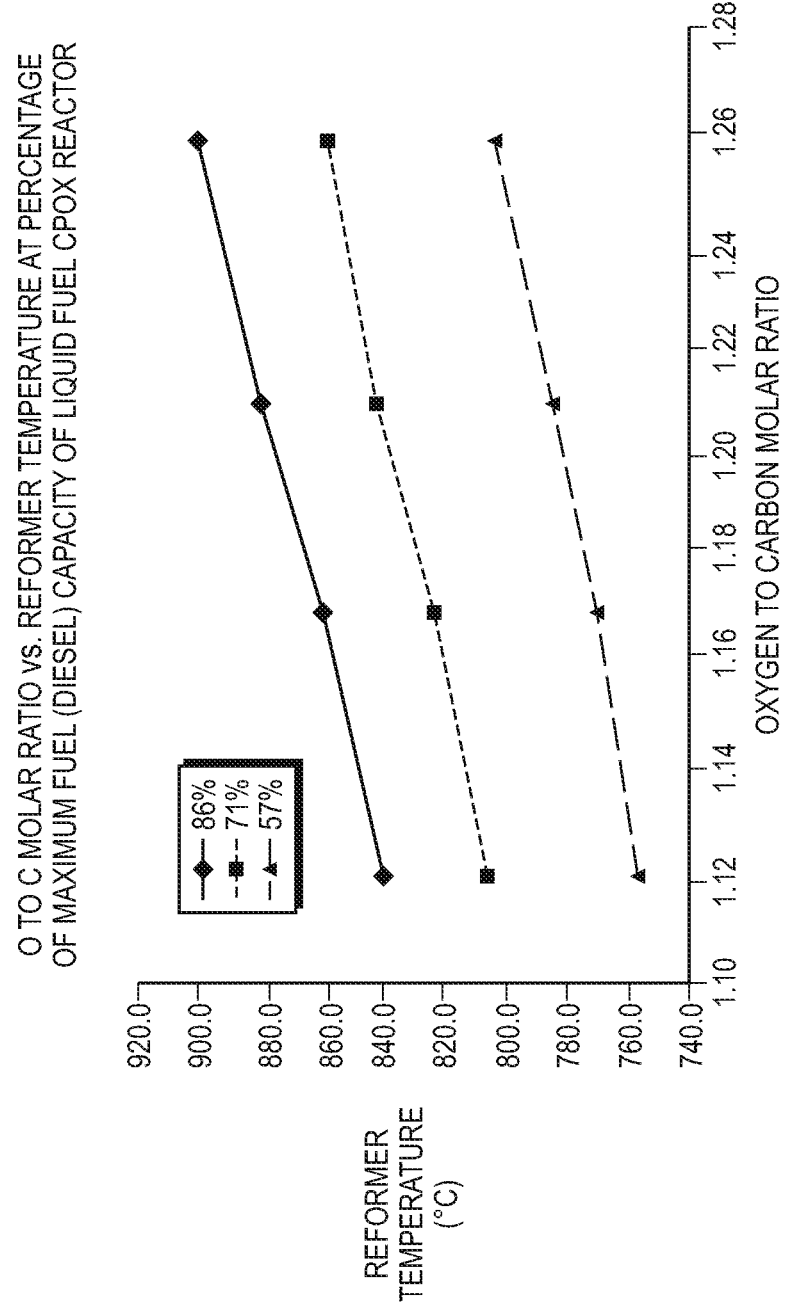
FIG. 7 presents graphical data showing the relationship between the molar ratio of oxygen to carbon of the reforming reaction mixture on the reforming reaction temperature within a liquid fuel reformer of the present teachings at varying percentages of maximum fuel (diesel) conversion capacity when the reformer is operating in the steady-state mode.

FIG. 7 presents graphical data demonstrating the relationship between the oxygen (O) to carbon (C) molar ratio of vaporized diesel fuel-air reforming reaction mixtures and reforming reaction temperature. As the data show, as the O to C molar ratio of the reforming reaction mixture is gradually reduced, i.e., as the reaction mixture is adjusted from a relatively carbon-lean one to a relatively carbon-rich one, reforming reaction temperature declines. These data hold several implications for optimized operations of a liquid fuel CPOX reformer in accordance with the present teachings.

To promote rapid heating of reforming catalyst and, consequently, the onset of gas phase CPOX reaction, gaseous CPOX reaction mixtures having higher O to C molar ratios (i.e., fuel-lean reaction mixtures) can be utilized during the start-up mode of operation of the reformer. The higher operating temperatures associated with fuel-lean CPOX reaction mixtures can facilitate a more rapid increase in CPOX catalyst temperature and reduced time to steady-state operation. Additionally, a fuel-lean ratio tends to help inhibit coke formation before the CPOX catalyst has attained its optimum temperature and become fully activated. Once the CPOX catalyst has reached a temperature of about 650° C. and above, the O to C molar ratio can be reduced as fuel flow is increased. Reducing the O to C molar ratio lowers the catalyst temperature and can enable more fuel to be processed without losing thermal control of the CPOX reactor units and in turn, the fuel vaporizer unit. The opposite action can be taken for the shut-down operation, i.e., fuel flow is reduced at a maintained O to C molar ratio. As the temperature of the CPOX reaction zones of the CPOX reactor units begin to approach or fall below a temperature resulting in coke formation, for example, below about 650° C., the O to C molar ratio can be increased to prevent or minimize coking as the CPOX catalyst deactivates. Typically, the CPOX reformer can be shut down when the temperature of the CPOX reaction mixture falls below about 500° C. The flow of oxygen-containing gas can be continued for up to about 15 to 20 seconds or so after fuel flow has been discontinued. Such a shut-down procedure can allow for vaporization and removal of fuel from the reformer that can be contained within a conduit or a section of fuel line between a fuel control valve and locus of introduction of the fuel into the conduit. This control characteristic can be influenced by various reformer components including the particular vaporizer system and controller unit components utilized in a specific reformer design.

The O to C molar ratio of the fuel-air CPOX reaction mixture can be controlled during the operation to tailor its output thermal conditions, with the understanding that changing the O to C molar ratio can result in changes to the quality and/or composition of the reformate. There is a range of O to C molar ratio that shifts from fuel-lean to fuel-rich as CPOX temperature increases above about 650° C. Different CPOX catalysts can affect the operational windows and CPOX temperatures. Additionally, different fuels (gaseous or liquid) can change the CPOX temperatures depending upon the efficiency of the reforming reactions.

Further in accordance with the present teachings, steam can be introduced into the reformer so that the reformer may be operated to carry out autothermal and/or steam reforming reaction(s).

In one embodiment, the reformer can be initially operated to perform CPOX conversion of a liquid or gaseous reformable fuel thereby providing heat of exotherm that, with or without additional heat, for example, supplied by an electric heater, can be recovered to produce steam in a steam generator. The thus-generated steam can be introduced into the reformer in one or more locations therein. One suitable location is the evaporator where the steam can provide heat to vaporize liquid fuel. For example, steam introduced into wick 315 in reformer 400 illustrated in FIG. 4A can provide heat for vaporizing liquid fuel on wick surfaces at the same time helping to eliminate or suppress clogging of such surfaces.

In another embodiment, a reformer in accordance with the present teachings can be connected to a fuel cell stack in which hydrogen-rich reformate from the reformer is converted to electrical current. Operation of the fuel cell stack, and where present an associated afterburner unit, can provide source(s) of waste heat that can be recovered and utilized for the operation of a steam generator, again, with or without additional heat such as that supplied by an electric heater. The steam from the steam generator can then be introduced into the reformer, for example, through wick 315 of reformer 400 of FIG. 4, to support autothermal or steam reforming. In this arrangement of integrated reformer and fuel cell stack, the source(s) of waste heat referred to can supply the necessary heat to drive endothermic reaction(s) that are involved in autothermal and steam reforming processes.

In sum, it should be understood that the delivery systems of the present teachings can deliver the appropriate reactants for carrying out reforming reactions including partial oxidation ("POX") reforming such as catalytic partial oxidation ("CPOX") reforming, steam reforming, and autothermal ("AT") reforming. The liquid reactants such as liquid reformable fuels and water can be delivered from and through the "liquid reformable fuel" delivery components, conduits, and assemblies of the delivery system. The gaseous reactants such as gaseous reformable fuels, steam, and an oxygen-containing gas such as air can be delivered from and through the "gaseous reformable fuel" delivery components, conduits, and assemblies of the delivery system. Certain gaseous reactants such as steam and an oxygen-containing gas can be delivered from and through components and assemblies that are peripheral or secondary to the delivery systems of the present teachings, for example, an oxygen-containing gas can be delivered from a source of oxygen-containing gas that is independently in operable fluid communication with at least one of a vaporizer, a reformer, and a fuel cell stack of a fuel cell unit or system, for example, to mix with a liquid reformable fuel and/or a vaporized liquid reformable fuel prior to reforming.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A method of reforming a liquid reformable fuel, the method comprising:
    introducing a stream of an oxygen-containing gas into a conduit configured to route fluids into an inlet of a reformer that produces a heat of exotherm during reforming of the reformable fuel;
    in a start-up operating mode, heating the stream of the oxygen-containing gas with a first source of heat comprising an electric heater disposed in the conduit;
    beginning a steady-state operating mode after a selected temperature of the reformer is reached and in the steady-state operating mode, heating the stream of oxygen-containing gas in the conduit with a second source of heat to the conduit comprising the heat of exotherm from the liquid fuel reformer and/or a hydrogen reformate-consuming device external to the liquid fuel reformer to provide a stream of heated oxygen-containing gas;

introducing into the stream of oxygen-containing gas that had been heated by the first or second source of heat, through or proximate to a vaporizer, a vaporized liquid reformable fuel and mixing the vaporized liquid reformable fuel with the heated oxygen containing gas to provide a heated gaseous reforming reaction mixture; and reforming the heated gaseous reforming reaction mixture to produce a hydrogen-rich reformate and the heat of exotherm.

2. The method of claim 1, comprising:
heating the stream of the oxygen-containing gas and/or the stream of heated oxygen-containing gas with a third source of heat comprising an electric heater disposed in the conduit downstream from the first and second sources of heat and upstream from the vaporizer.

3. The method of claim 2, comprising:
heating the stream of oxygen-containing gas until the steady-state mode begins and then discontinuing heating the stream of oxygen-containing gas with the first source of heat; and heating the stream of oxygen-containing gas with the second and third sources of heat.

4. The method of claim 1 comprising adjusting the heat supplied by the second source and/or third source of heat.

5. The method of claim 1, comprising heating the liquid reformable fuel using the second source of heat and/or the third source of heat, when present, prior to introducing the liquid reformable fuel into the vaporizer.

6. The method of claim 1, wherein the liquid reformable fuel introduced into the stream of heated oxygen-containing gas vaporizes on contact with the heated oxygen-containing gas.

7. The method of claim 1, wherein the electric heaters are electrical resistance heaters.

8. The method of claim 2, wherein the hydrogen reformate-consuming device comprises a fuel cell unit and the heat of exotherm comprises heat from a fuel cell stack and/or an afterburner of the fuel cell unit.

9. The method of claim 1, comprising:
monitoring the flow rate of the stream of heated oxygen-containing gas, the flow rate of liquid reformable fuel, the temperature of the vaporizer, the temperature of the stream of heated oxygen-containing gas and the temperature of the liquid reformable fuel; and
controlling the vaporization of the liquid reformable fuel in response to the results of the monitoring.

10. The method of claim 9, wherein controlling the vaporization comprises adjusting the heat supplied by the second source of heat and the third source of heat.

11. The method of claim 1, wherein reforming the heated gaseous reforming reaction mixture comprises autothermal reforming, and the method further comprises introducing steam into the conduit to provide a heated gaseous reforming reaction mixture comprising the gaseous liquid reformable fuel, the oxygen-containing gas and steam.

12. The method of claim 11, wherein introducing steam into the conduit comprises introducing steam through the vaporizer.

13. The method of claim 12, wherein the vaporizer comprises a fuel spreader and introducing steam through the vaporizer comprises introducing steam through the fuel spreader.

14. A method of steam reforming a liquid reformable fuel, the method comprising:
generating steam with a source of heat selected from an electric heater, heat of exotherm of a reforming reaction and heat from a hydrogen reformate consuming device;
introducing a stream of the steam through or proximate to a liquid reformable fuel vaporizer to provide a heated gaseous steam reforming reaction mixture; and
reforming the heated gaseous reforming reaction mixture to produce a hydrogen-rich reformate.

15. The method of claim 14, further comprising:
introducing steam through a fuel spreader of the vaporizer.

16. The method of claim 14 wherein part of the air comprising gaseous reforming reaction mixture is introduced to the conduit downstream from the vaporizer.

* * * * *